(12) United States Patent
Mannella et al.

(10) Patent No.: US 9,073,263 B2
(45) Date of Patent: Jul. 7, 2015

(54) SPOOL ASSEMBLY FOR ADDITIVE MANUFACTURING SYSTEM, AND METHODS OF MANUFACTURE AND USE THEREOF

(75) Inventors: Dominic F. Mannella, Minnetonka, MN (US); William J. Swanson, St. Paul, MN (US); Timothy A. Hjelsand, Waconia, MN (US); David M. Kozlak, Minneapolis, MN (US); Chad E. Beery, Mound, MN (US)

(73) Assignee: Stratasys, Inc., Eden Prairie, MN (US)

( * ) Notice: Subject to any disclaimer, the term of this patent is extended or adjusted under 35 U.S.C. 154(b) by 494 days.

(21) Appl. No.: 13/334,910

(22) Filed: Dec. 22, 2011

(65) Prior Publication Data

US 2013/0161442 A1   Jun. 27, 2013

(51) Int. Cl.
   *B65H 49/32* (2006.01)
   *B29C 67/00* (2006.01)

(52) U.S. Cl.
   CPC ....... *B29C 67/0055* (2013.01); *Y10T 29/49401* (2015.01); *B29C 67/0051* (2013.01)

(58) Field of Classification Search
   CPC .......... B29C 67/0051; B29C 67/0055
   USPC ........ 242/598, 598.5, 598.6, 595.1, 170, 171, 242/384.3; 425/375
   See application file for complete search history.

(56) References Cited

U.S. PATENT DOCUMENTS

| | | | |
|---|---|---|---|
| 3,054,382 A | 9/1962 | Ebel |
| 4,749,347 A | 6/1988 | Valavaara |
| 5,121,329 A | 6/1992 | Crump |
| 5,303,141 A | 4/1994 | Batchelder et al. |
| 5,312,224 A | 5/1994 | Batchelder et al. |
| 5,340,433 A | 8/1994 | Crump |
| 5,426,722 A | 6/1995 | Batchelder |
| 5,503,785 A | 4/1996 | Crump et al. |
| 5,653,925 A | 8/1997 | Batchelder |
| 5,738,817 A | 4/1998 | Danforth et al. |
| 5,764,521 A | 6/1998 | Batchelder et al. |
| 5,866,058 A | 2/1999 | Batchelder et al. |
| 5,939,008 A | 8/1999 | Comb et al. |
| 5,968,561 A | 10/1999 | Batchelder et al. |
| 6,004,124 A | 12/1999 | Swanson et al. |
| 6,022,207 A | 2/2000 | Dahlin et al. |
| 6,028,410 A | 2/2000 | Leavitt et al. |
| 6,054,077 A | 4/2000 | Comb et al. |

(Continued)

FOREIGN PATENT DOCUMENTS

| | | |
|---|---|---|
| WO | 9804489 A1 | 2/1998 |
| WO | 9937454 A1 | 7/1999 |
| WO | WO 2009088995 A1 | 7/2009 |

OTHER PUBLICATIONS

U.S. Appl. No. 13/242,561, filed Sep. 23, 2011, entitled "Gantry Assembly for Use in Additive Manufacturing System".

(Continued)

*Primary Examiner* — Joseph S Del Sole
*Assistant Examiner* — Lawrence D Hohenbrink, Jr.
(74) *Attorney, Agent, or Firm* — Westman, Champlin & Koehler, P.A.

(57) ABSTRACT

A spool assembly for use in an additive manufacturing system, comprising a spool rotatably retained in a sealed sheath in a hub-less manner, and a locking mechanism configured to operably engage with the spool to prevent the spool from rotating.

10 Claims, 16 Drawing Sheets

(56) References Cited

U.S. PATENT DOCUMENTS

| | | | |
|---|---|---|---|
| 6,067,480 A | 5/2000 | Stuffle et al. |
| 6,070,107 A | 5/2000 | Lombardi et al. |
| 6,085,957 A | 7/2000 | Zinniel et al. |
| 6,129,872 A | 10/2000 | Jang |
| 6,228,923 B1 | 5/2001 | Lombardi et al. |
| 6,250,735 B1 | 6/2001 | Kaneko et al. |
| 6,547,995 B1 | 4/2003 | Comb |
| 6,629,011 B1 | 9/2003 | Calderon et al. |
| 6,645,412 B2 | 11/2003 | Priedeman, Jr. |
| 6,685,866 B2 | 2/2004 | Swanson et al. |
| 6,722,872 B1 | 4/2004 | Swanson et al. |
| 6,749,414 B1 | 6/2004 | Hanson et al. |
| 6,776,602 B2 | 8/2004 | Swanson et al. |
| 6,790,403 B1 | 9/2004 | Priedeman, Jr. et al. |
| 6,814,907 B1 | 11/2004 | Comb |
| 6,866,807 B2 | 3/2005 | Comb et al. |
| 6,869,559 B2 | 3/2005 | Hopkins |
| 6,923,634 B2 | 8/2005 | Swanson et al. |
| 6,998,087 B1 | 2/2006 | Hanson et al. |
| 7,122,246 B2 | 10/2006 | Comb et al. |
| 7,169,337 B2 | 1/2007 | Swanson et al. |
| 7,172,715 B2 | 2/2007 | Swanson et al. |
| 7,297,304 B2 | 11/2007 | Swanson et al. |
| 7,314,591 B2 | 1/2008 | Priedeman, Jr. |
| 7,341,214 B2 | 3/2008 | Taatjes et al. |
| 7,374,712 B2 | 5/2008 | Swanson et al. |
| 7,384,255 B2 | 6/2008 | LaBossiere et al. |
| 7,604,470 B2 | 10/2009 | LaBossiere et al. |
| 7,625,200 B2 | 12/2009 | Leavitt |
| 7,938,351 B2 | 5/2011 | Taatjes et al. |
| 7,938,356 B2 | 5/2011 | Taatjes et al. |
| 2005/0173838 A1 | 8/2005 | Priedeman et al. |
| 2007/0001050 A1 | 1/2007 | Taatjes et al. |
| 2007/0228590 A1 | 10/2007 | LaBossiere et al. |
| 2007/0228592 A1 | 10/2007 | Dunn et al. |
| 2008/0169585 A1 | 7/2008 | Zinniel |
| 2009/0035405 A1 | 2/2009 | Leavitt |
| 2009/0263582 A1 | 10/2009 | Batchelder |
| 2009/0273122 A1 | 11/2009 | Batchelder et al. |
| 2009/0274540 A1 | 11/2009 | Batchelder et al. |
| 2010/0021580 A1 | 1/2010 | Swanson et al. |
| 2010/0096072 A1 | 4/2010 | Hopkins et al. |
| 2010/0096485 A1* | 4/2010 | Taatjes et al. ............... 242/171 |
| 2010/0096489 A1 | 4/2010 | Taatjes et al. |
| 2010/0100224 A1 | 4/2010 | Comb et al. |
| 2010/0283172 A1* | 11/2010 | Swanson ..................... 264/80 |
| 2011/0074065 A1 | 3/2011 | Batchelder et al. |
| 2011/0076495 A1 | 3/2011 | Batchelder et al. |
| 2011/0076496 A1 | 3/2011 | Batchelder et al. |
| 2011/0117268 A1 | 5/2011 | Batchelder et al. |
| 2011/0121476 A1 | 5/2011 | Batchelder et al. |
| 2011/0233804 A1 | 9/2011 | Batchelder et al. |
| 2012/0018924 A1 | 1/2012 | Swanson et al. |
| 2012/0061504 A1* | 3/2012 | Powell ......................... 242/564 |
| 2012/0068378 A1 | 3/2012 | Swanson et al. |
| 2012/0070523 A1 | 3/2012 | Swanson et al. |
| 2012/0162314 A1* | 6/2012 | Swanson et al. .............. 347/37 |

OTHER PUBLICATIONS

Partial Supplementary European Search Report dated Apr. 2, 2015, for corresponding European Patent Application No. 12199319.0, filed Dec. 24, 2012.

* cited by examiner

SPOOL ASSEMBLY FOR ADDITIVE MANUFACTURING SYSTEM, AND METHODS OF MANUFACTURE AND USE THEREOF

CROSS-REFERENCE TO RELATED APPLICATION(S)

Reference is hereby made to co-filed U.S. patent application Ser. No. 13/334,896, entitled "SPOOL ASSEMBLY WITH LOCKING MECHANISM FOR ADDITIVE MANUFACTURING SYSTEM, AND METHODS OF USE THEREOF", the disclosure of which is incorporated by reference in its entirety.

BACKGROUND

The present disclosure relates to additive manufacturing systems for building three-dimensional (3D) parts with layer-based, additive manufacturing techniques. In particular, the present disclosure relates to spool assemblies for supplying consumable part and support materials to additive manufacturing systems.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the part material during fabrication, and is removable from the completed 3D part when the printing process is complete.

SUMMARY

An aspect of the present disclosure is directed to a spool assembly that includes a housing structure, a spool, and first and second bearing supports. The spool has a first axis of rotation, and is configured to reside in an interior region of the housing structure in a manner that is free or substantially free of any hub engagement. The spool comprises a filament-receiving shaft having a first end and a second end offset along the first axis of rotation, a first flange extending from the first end of the filament-receiving shaft and having a first perimeter edge, and a second flange extending from the second end of the filament-receiving shaft, and having a second perimeter edge. The first bearing support is mounted to the housing structure within the interior region, and the second bearing support is mounted to the housing structure within the interior region at an offset location from the first bearing support. The first and second bearing supports are configured to support the first perimeter edge of the first flange and the second perimeter edge of the second flange while the spool is rotated around the first axis of rotation.

Another aspect of the present disclosure is directed to a method for printing a three-dimensional part using an additive manufacturing system. The method includes providing a spool assembly comprising a part material filament retained on a hub-less spool that is rotatably retained within a sealed sheath. The method also includes drawing the part material filament from the spool to a print head retained by the additive manufacturing system through a flexible tube that has a first end disposed within the sealed sheath and a second end coupled to the print head, where the sealed sheath remains sealed during the drawing step. The method also includes melting the fed filament with the print head assembly to produce a molten material, and depositing a molten material in the additive manufacturing system in a layer-by-layer manner to form at least a portion of the three-dimensional part.

Another aspect of the present disclosure is directed to a method of manufacturing a spool assembly. The method includes rotatably enclosing a spool within a housing structure in a hub-less manner, where the spool retains a supply of a filament, and mounting a seal component to the housing structure. The method also includes feeding a portion of the filament from the spool, through a flexible tube extending through the seal component, and to a print head. The method further includes sealing the housing structure retaining the spool in a sheath to provide a barrier for the housing structure, where a portion of the seal component extends out of the sealed sheath such that the print head and a portion of the flexible tube are disposed outside of the sealed sheath.

DETAILED DESCRIPTION

The present disclosure is directed to a spool assembly (also referred to as a consumable assembly) for use in an additive manufacturing system, such as an extrusion-based additive manufacturing system. The spool assembly is an easily loadable, removable, and replaceable container device configured to retain a supply of part or support material filament. The spool assembly includes a container portion having a spool and a housing structure, where the supply of part or support material filament is wound around the spool.

In one embodiment, the spool assembly also includes a moveable locking arm that engages the spool through a sheath (e.g., a moisture-impermeable sheath) and a housing structure. The locking arm desirably does not puncture or otherwise penetrate through the sheath to preserve a barrier from ambient conditions (e.g., moisture barrier) in the container portion. When engaged with the spool, the locking arm prevents the spool from rotating, which can otherwise cause the retained filament to unravel prior to use in an additive manufacturing system. As discussed below, when the spool assembly is loaded into a bay of an additive manufacturing system, the locking arm mechanically disengages from the spool in a hands-free manner. This prevents the spool assembly from being used in an additive manufacturing system while the locking arm remains engaged with the spool.

In another embodiment, the spool is rotatably retained in the housing structure in a hub-less manner, in that the spool is not supported by a hub mount of the housing structure. Instead, when the spool assembly is positioned in an upright orientation, the spool rests on bearing supports (e.g., bearing rollers) located at the bottom of the housing structure. As discussed below, this reduces frictional resistance between the spool and the housing structure while the spool rotates.

Figure 1:
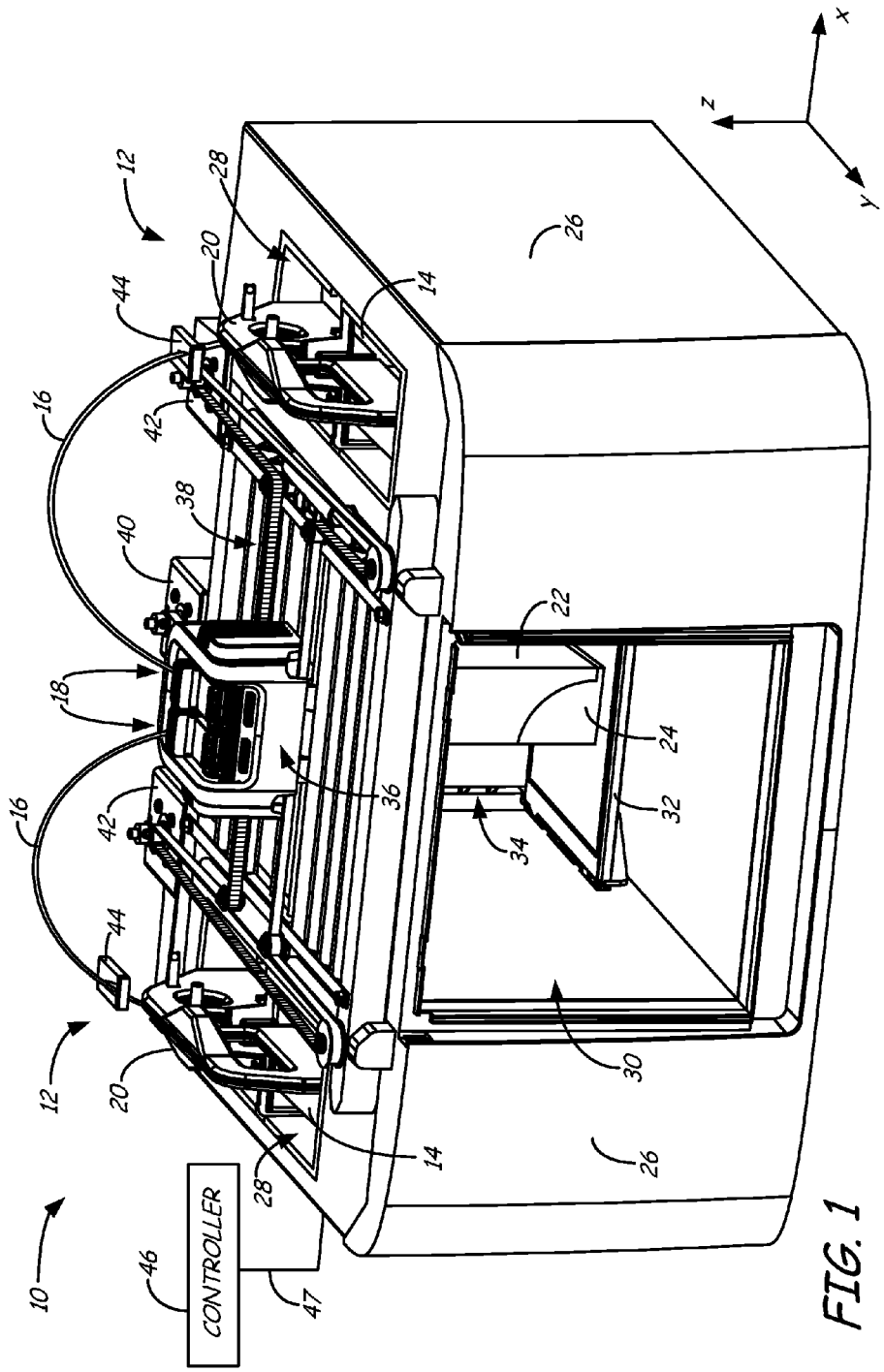
FIG. 1 is a top perspective view of an additive manufacturing system in use with spool assemblies of the present disclosure, where the spool assemblies are loaded to the additive manufacturing system.
Figure 2:
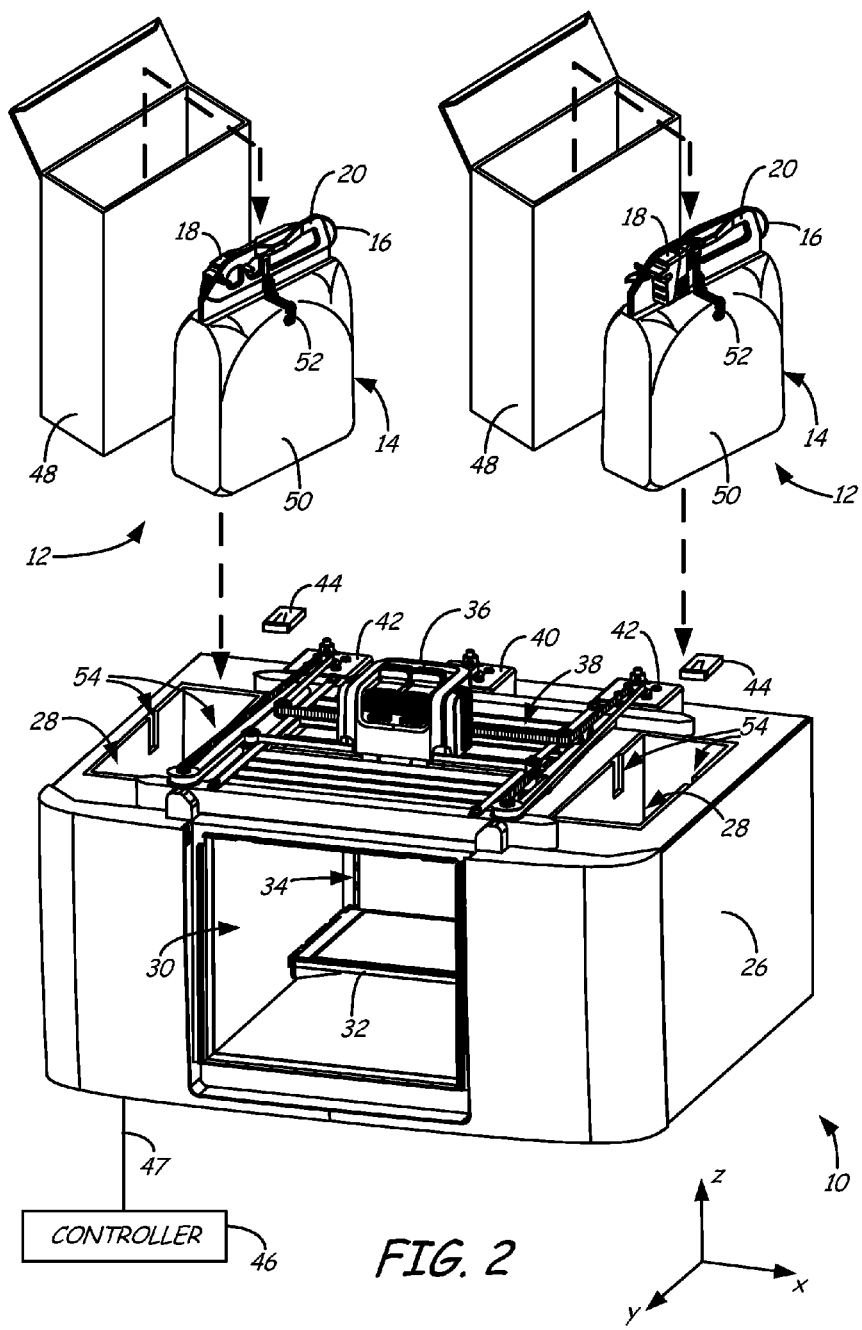
FIG. 2 is a top perspective view of the additive manufacturing system in use with the spool assemblies, illustrating a process for loading the spool assemblies to the additive manufacturing system.

FIGS. 1 and 2 show system 10 in use with two spool assemblies 12 of the present disclosure, where each spool assembly 12 is an easily loadable, removable, and replaceable container device that retains a consumable filament for printing with system 10. Typically, one of the spool assemblies 12 contains a supply of part material filament ("part material spool assembly"), and the other spool assembly 12 contains a supply of support material filament ("support material spool assembly"). However, both spool assemblies 12 may be identical in structure.

As shown in FIG. 1, each spool assembly 12 includes container portion 14, guide tube 16, print head 18, and handle 20, where container portion 14 retains a spooled supply of a consumable filament. Guide tube 16 interconnects container portion 14 and print head 18 to supply successive segments of the filament from container portion 14 to print head 18. Handle 20 is attached to container portion 14 and allows a user to conveniently grip and carry spool assembly 12. As discussed below, handle 20 is also suitable for storing guide tube 16 and print head 18 when spool assembly 12 is not loaded to system 10 (e.g., during transportation and storage).

System 10 is an additive manufacturing system for printing 3D parts or models and corresponding support structures (e.g., 3D part 22 and support structure 24) from the part and support material filaments, respectively, of spool assemblies 12, using a layer-based, additive manufacturing technique. Suitable additive manufacturing systems for system 10 include extrusion-based systems developed by Stratasys, Inc., Eden Prairie, Minn. under the trademarks "FDM" and "FUSED DEPOSITION MODELING". As shown, system 10 includes system casing 26, two bays 28, build chamber 30, platen 32, platen gantry 34, head carriage 36, head gantry 38, z-axis motor 40, and a pair of x-y motors 42.

System casing 26 is a structural component of system 10 and may include multiple structural sub-components such as support frames, housing walls, and the like. In the shown embodiment, system casing 26 defines the dimensions of bays 28, and of build chamber 30. Bays 28 are container bays configured to respectively receive container portions 14 of spool assemblies 12. Typically, each of bays 28 may be intended to receive either a part material spool assembly 12 or a support material spool assembly 12.

As shown, container portions 14 are loaded into bays 28 in their upright orientations, such that spools retained within container portions 14 (not shown in FIG. 1) each have an axis of rotation substantially aligned with a horizontal x-y plane. In the example shown in FIG. 1, the spools each have an axis of rotation substantially along the x-axis. As discussed below, rotating the spools while container portions 14 are upright allow the spools to rotate in a hub-less manner with reduced frictional resistance.

In the example shown in FIG. 1, the horizontal x-y plane is a horizontal plane defined by the x-axis and the y-axis, where the x-axis, the y-axis, and the vertical z-axis are orthogonal to each other. The terms "about" and "substantially" are used herein with respect to measurable values and ranges due to expected variations known to those skilled in the art (e.g., limitations and variabilities in measurements).

In an alternative embodiment, bays 28 may be omitted to reduce the overall footprint of system 10. In this embodiment, container portions 14 may stand upright adjacent to system casing 26, while providing sufficient ranges of movement for guide tubes 16 and print heads 18. Bays 28, however, provide convenient locations for loading spool assemblies 12.

Build chamber 30 is an enclosed environment that contains platen 32 for printing 3D part 22 and support structure 24. Build chamber 30 may be heated (e.g., with circulating heated air) to reduce the rate at which the part and support materials solidify after being extruded and deposited (e.g., to reduce distortions and curling). In alternative embodiments, build chamber 30 may be omitted and/or replaced with different types of build environments. For example, 3D part 22 and support structure 24 may be built in a build environment that is open to ambient conditions or may be enclosed with alternative structures (e.g., flexible curtains).

Platen 32 is a platform on which 3D part 22 and support structure 24 are printed in a layer-by-layer manner, and is supported by platen gantry 34. In some embodiments, platen 32 may also include a flexible polymeric film or liner on which 3D part 22 and support structure 24 are printed. Platen gantry 34 is a gantry assembly configured to move platen 32 along (or substantially along) the vertical z-axis and is powered by z-axis motor 40.

Head carriage 36 is a unit configured to receive one or more removable print heads, such as print heads 18, and is supported by head gantry 38. Examples of suitable devices for head carriage 36, and techniques for retaining print heads 18 in head carriage 36, include those disclosed in Swanson et al., U.S. patent application Ser. No. 12/976,111; Swanson, U.S. Patent Application Publication No. 2010/0283172; and Swanson, International Publication No. WO2009/088995.

Head gantry 38 is a belt-driven gantry assembly configured to move head carriage 36 (and the retained print heads 18) in (or substantially in) a horizontal x-y plane above build chamber 30, and is powered by x-y motors 42. Examples of suitable gantry assemblies for head gantry 38 include those disclosed in Comb et al., U.S. patent Ser. No. 13/242,561.

As further shown in FIG. 1, system 10 may also include a pair of sensor assemblies 44, which, in the shown embodiment, are located adjacent to bays 28. Sensor assemblies 44 are configured to receive and retain guide tubes 16, while also providing sufficient ranges of movement for guide tubes 16 and print heads 18. Sensor assemblies 44 are also configured to read encoded markings from successive segments of the filaments moving through guide tubes 16. Examples of suitable devices for sensor assemblies 44 include those disclosed in Batchelder et al., U.S. Patent Application Publication Nos. 2011/0117268, 2011/0121476, and 2011/0233804.

System 10 also includes controller 46, which is one or more processor-based controllers that may communicate over communication line 47 with print heads 18, build chamber 30 (e.g., with a heating unit for build chamber 30), head carriage 36, motors 40 and 42, sensor assemblies 44, and various sensors, calibration devices, display devices, and/or user input devices. In some embodiments, controller 46 may also communicate with one or more of bays 28, platen 32, platen gantry 34, head gantry 38, and any other suitable component of system 10.

While illustrated as a single signal line, communication line 47 may include one or more electrical, optical, and/or wireless signal lines, allowing controller 46 to communicate with various components of system 10. Furthermore, while illustrated outside of system 10, controller 46 and communication line 47 may be internal components to system 10.

During operation, controller 46 directs z-axis motor 40 and platen gantry 34 to move platen 32 to a predetermined height within build chamber 30. Controller 46 then directs motors 42 and head gantry 38 to move head carriage 36 (and the retained print heads 18) around in the horizontal x-y plane above build chamber 30. Controller 46 may also direct print heads 18 to selectively draw successive segments of the filaments from container portions 14 and through guide tubes 16, respectively.

Each print head 18 thermally melts the successive segments of the received filament such that it becomes a molten material, thereby allowing the molten material to be extruded and deposited onto platen 32 for printing 3D part 22 and support structure 24 in a layer-by-layer manner. After the print operation is complete, the resulting 3D part 22 and support structure 24 may be removed from build chamber 30, and support structure 24 may be removed from 3D part 22. 3D part 22 may then undergo one or more additional post-processing steps.

As discussed above, spool assemblies 12 are removable and replaceable container devices. As shown in FIG. 2, prior to a print operation, spool assemblies 12 may be loaded to system 10 by individually removing spool assemblies 12 from their packages. For example, each spool assembly 12 may be retained in a box (e.g., box 48) during shipping and storage, where box 48 may include a variety of indicia and graphics for identifying the material types contained in the respective spool assembly 12 contained therein. While spool assembly 12 is retained in box 48, guide tube 16 may be conveniently wrapped around and/or through handle 20, and print head 18 may be mounted to handle 20. In alternative embodiments, guide tube 16 and/or print head 18 may be secured to one or more retention mechanisms inside box 48. In additional alternative embodiments, handle 22 may have a variety of different designs for a user to grasp, or may be omitted to a handle on box 48 (e.g., a handle cut or otherwise formed in box 48).

Container portion 14 of each spool assembly 12 includes wrapper bag 50, which is an example of a suitable sheath for container portion 14, and which is secured to handle 20. Wrapper bag 50 may be any suitable sheath, such as polymeric bags, wrappings (e.g., shrink wrap liner), metallic foil casings, and the like, which desirably prevent or substantially prevent ambient conditions from reaching the spooled filament in container portion 14. For example, wrapper bag 50 may be a moisture-impermeable sheath to provide a moisture barrier, a gas-impermeable sheath to provide a gas barrier, a particulate-impermeable sheath to provide a dust barrier, and the like.

In the case of moisture-sensitive materials, the spooled filament is desirably provided to print head 18 in a dry state (e.g., less than 300 parts-per-million by weight of water) to prevent moisture from negatively affecting the extrusion process. As such, wrapper bag 50 may provide a moisture barrier for the filament during transportation, storage, and use in system 10.

Additionally, wrapper bag 50 may be deformable, as shown, to conform to the dimensions of the components of container portion 14 that are retained within wrapper bag 50. In some embodiments, wrapper bag 50 may also be opaque to reduce light exposure (e.g., ultraviolet light exposure), to reduce the risk of degrading the spooled filament over extended periods of storage.

After removal from box 48, the user may load spool assembly 12 into bay 28 by lowering container spool assembly 12 into bay 28 in the shown upright orientation. Each spool assembly 12 includes locking arm 52 slidably coupled to handle 20, and each bay 28 includes a pair of opposing bay slots 54 configured to move locking arm 52 when spool assembly 12 is loaded into bay 28. Briefly, locking arm 52 is an actuatable arm that engages with the spool (not shown in FIG. 2) retained within wrapper bag 50 to prevent the spool from rotating within wrapper bag 50. This is beneficial during transportation and storage to prevent the filament from unraveling from the spool within container portion 14 prior to use in system 10. Locking arm 52, however, does not puncture or otherwise penetrate through wrapper bag 50 to preserve the barrier from ambient conditions.

When spool assembly 12 is lowered into bay 28, locking arm 52 inserts into bay slots 54 of bay 28, which press locking arm 52 upward to disengage locking arm 52 from the spool. This allows the spool to be unlocked in a hands-free manner when container portion 14 is loaded into bay 28. As can be appreciated, this hands-free disengagement of locking arm 52 prevents system 10 from operating with spool assembly 12 in its locked state. If this hands-free disengagement were otherwise omitted, and the user neglected to manually disengage locking arm 52, print head 18 would have issues pulling the consumable filament from container portion 14 since the spool would be locked against rotating.

Once loaded into bay 28, the user may remove guide tube 16 and print head 18 from handle 20, and engage guide tube 16 through sensor assembly 44. The user may then insert print head 18 into head carriage 36 as discussed in Swanson et al., U.S. patent application Ser. No. 12/976,111. In alternative embodiments, the user may remove guide tube 16 and print head 18 from handle 20, engage guide tube 16 through sensor assembly 44, and/or insert print head 18 into head carriage 36 prior to loading container portion 14 into bay 28.

As discussed in Swanson et al., U.S. patent application Ser. No. 12/976,111; Swanson, U.S. Patent Application Publication No. 2010/0283172; and Swanson, International Publication No. WO2009/088995, the filament in the loaded spool assembly 12 may be pre-fed through guide tube 16, and into print head 18. In this embodiment, print head 18 includes a filament drive mechanism for drawing successive segments of the consumable filament from container portion 14 and through guide tube 16. As such, once each spool assembly 12 is loaded, system 10 may begin to use the filaments during one or more pre-printing operations (e.g., calibration routines) or during print operations without requiring the user to perform any additional loading tasks.

Spool assemblies 12 may remain loaded to system 10 until they individually exhaust their supplies of filaments, or until the user decides to replace them for any desired reason (e.g., for printing with different colors or compositions). Either spool assembly 12 may be unloaded from system 10 by removing print head 18 from head carriage 36, removing guide tube 16 from sensor assembly 44, and pulling container portion 14 out of bay 28 by handle 20.

If the unloaded spool assembly 12 has exhausted its supply of the consumable material filament, it is not necessary to re-engage locking arm 52 with the spool retained within wrapper bag 50 (although, there is no harm in doing so). Instead, the empty spool assembly 12 may be recycled or otherwise discarded in an environmentally-friendly manner. A replacement spool assembly 12 may then be loaded to system 10 following the same steps discussed above.

Alternatively, if the unloaded spool assembly 12 still retains a portion of its supply of the consumable filament, the user may re-engage locking arm 52 with the spool retained within wrapper bag 50 to prevent the spool from rotating during storage. Additionally, in this situation, a segment of the consumable filament will remain extending through guide tube 16 and into print head 18. As such, when desired, the user may readily reload spool assembly 12 to system 10 following the same steps discussed above for use in a new printing operation.

In the shown embodiment, container portion 14, guide tube 16, handle 20, and locking mechanism 52 of each spool assembly 12 are free of electronic components, such as filament drive mechanisms, motorized spool-rotating mechanisms, electronic connectors to system 10, and the like. Instead, all electronic components of spool assemblies 12 for communicating with system 10 and for feeding successive segments of the part and support material filaments to system 10 are retained in print heads 18, such as discussed in Swanson et al., U.S. patent application Ser. No. 12/976,111. In other embodiments, the electronic components need not be limited to the print head portion of the spool assembly, and could include, for example, wireless communications between the sealed spool and the system 10.

Spool assemblies 12 may alternatively remain in boxes 48 while being loaded to bays 28. In this embodiment, upon loading a spool assembly 12/box 48 into a bay 28, the user may pull locking arm 52 upward to disengage locking arm 52 from the spool retaining within wrapper bag 50.

Spool assemblies 12 and/or boxes 48 may also include indicators to allow users to visually distinguish their contents. For example, print heads 18, handles 20, and/or wrapper bags 68 may include indicia and/or colors that describe their retained filament materials. Bays 28 may also include corresponding indicia, such as indicia of "part material" and "support material", and/or colors.

Furthermore, in the shown embodiment, print head 18 may be mounted to either side of handle 20. For example, in the view shown in FIG. 2, print heads 18 are retained by the opposing sides of handles 20. Due to this, spool assemblies 12 may appear as mirror images to each other, allowing the user to recognize which bay to load a particular spool assembly 12 into.

Figure 3:
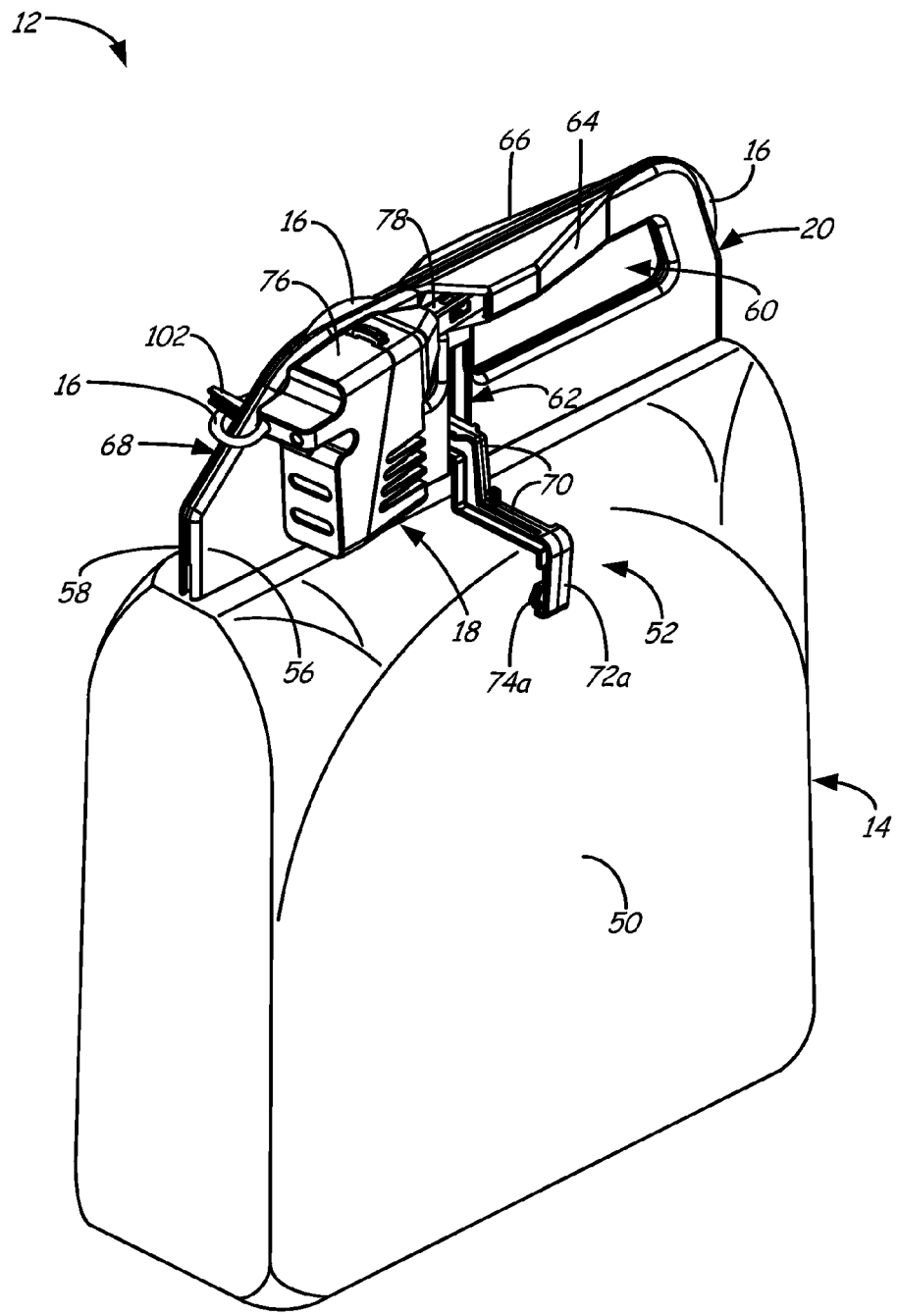
FIG. 3 is a top right-side perspective view of one of the spool assemblies.

As shown in FIG. 3, handle 20 is fabricated from opposing handle sections 56 and 58, which are secured together around a top portion of wrapper bag 50. Handle sections 56 and 58 are rigid components fabricated from one or more polymeric and/or metallic materials, and define handle opening 60, lock slot 62, holsters 64 and 66, and tube channel 68.

Handle opening 60 is an opening for a user to extend his or her hand through to grip handle 20. The location of handle 20 relative to container portion 14 allows container portion 14 to be suspended in its upright orientation, as shown, such as when the user grips handle 20 at handle opening 60. Thus, container portion 14 may be conveniently lowered into bay 28 in its upright orientation.

Lock slot 62 is an elongated slot that extends vertically when container portion 14 is upright, where locking arm 52 is slidably coupled to handle 20 at lock slot 62. In particular, locking arm 52 includes a laterally-extending collarbone member 70, a pair of downward-extending appendages 72a and 72b that extend downward from the opposing ends of collarbone member 70, and a pair of contact tips 74a and 74b at the bottom ends of appendages 72a and 72b (appendage 72b and contact tip 74b are not shown in FIG. 3). As discussed below, collarbone member 70 is configured to slide up and down within lock slot 62 to respectively disengage and engage contact tips 74a and 74b with opposing sides of the spool (not shown in FIG. 3) retained within wrapper bag 50.

Holster 64 is a first rigid housing configured to protect print head 18 when retained by handle 20, as shown. In the shown example, print head 18 includes cartridge assembly 76 and liquefier pump assembly 78, where cartridge assembly 76 is mounted to handle 20 and liquefier pump assembly 78 is inserted within holster 64. This arrangement allows the user to grip handle 20 through handle opening 60 without damaging a tip end of liquefier pump assembly 78.

Holster 66 is a second rigid housing, which, optionally, allows print head 20 to be mounted to the opposing side of handle 20. This allows print head 20 to be retained on either side of handles 22, as shown above in FIG. 2.

Tube channel 68 extends through the top portion of handle 20, between handle sections 56 and 58, and provides a convenient location to retain guide tube 16, as shown. As such, a first end of guide tube 16 extends within container portion 14, and a second end of guide tube 16 extends within cartridge assembly 76 of print head 18. The middle portion of guide tube 16 between its first and second ends may then be wound through tube channel 68 for transportation and storage.

Figure 4A:
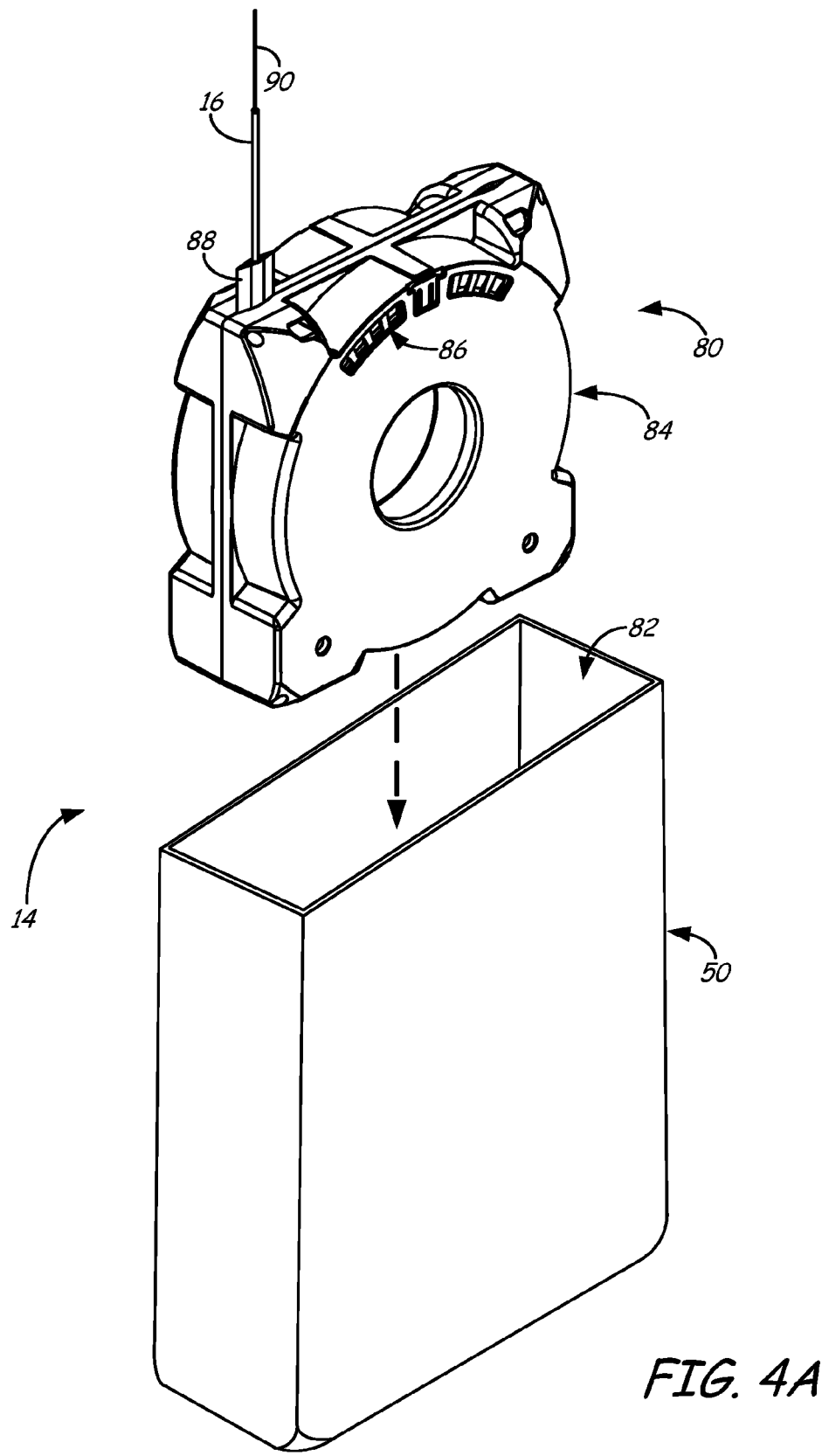
FIG. 4A-4C are perspective views of the spool assembly, illustrating a process for manufacturing the spool assembly.
Figure 4B:
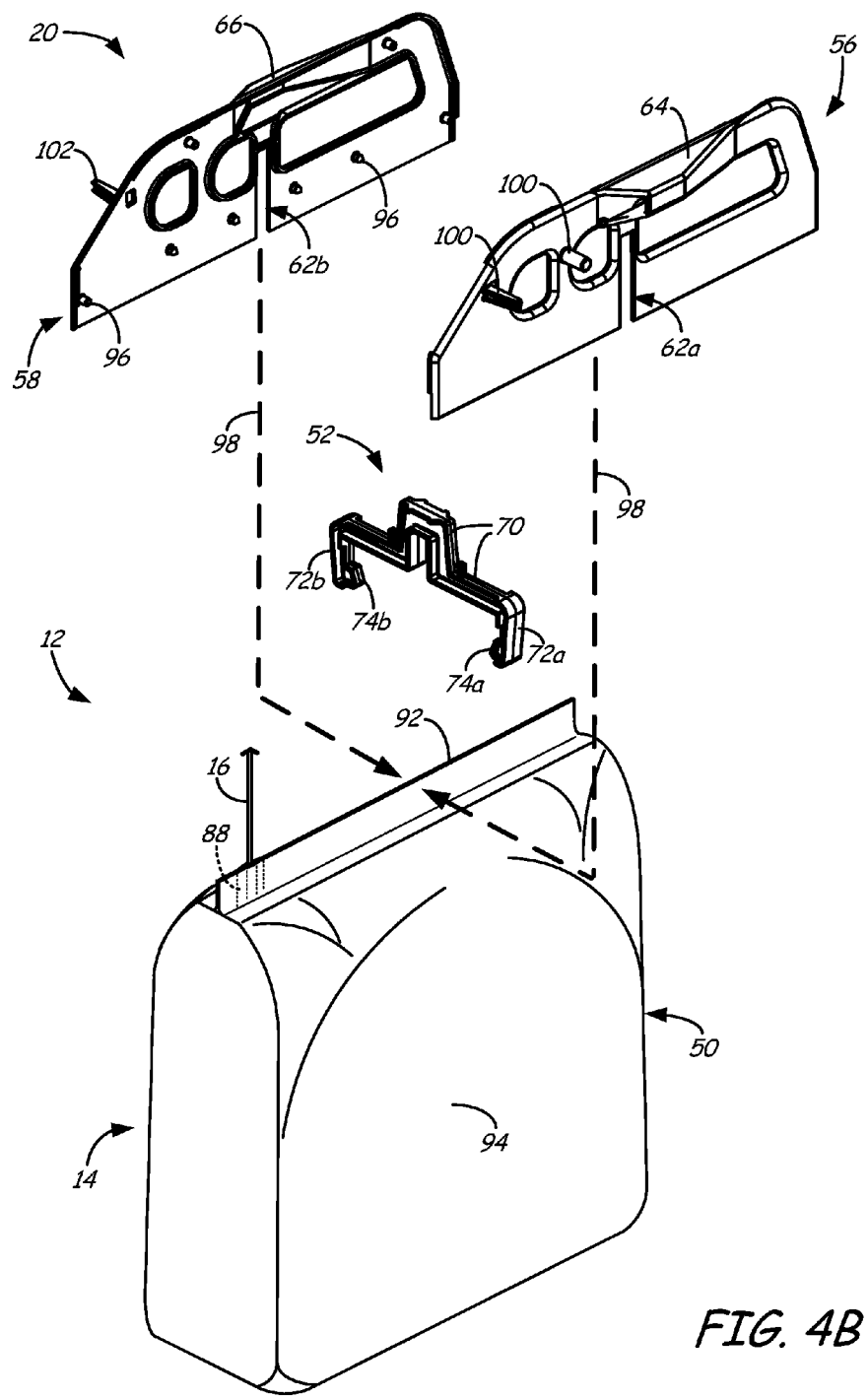
Figure 4C:
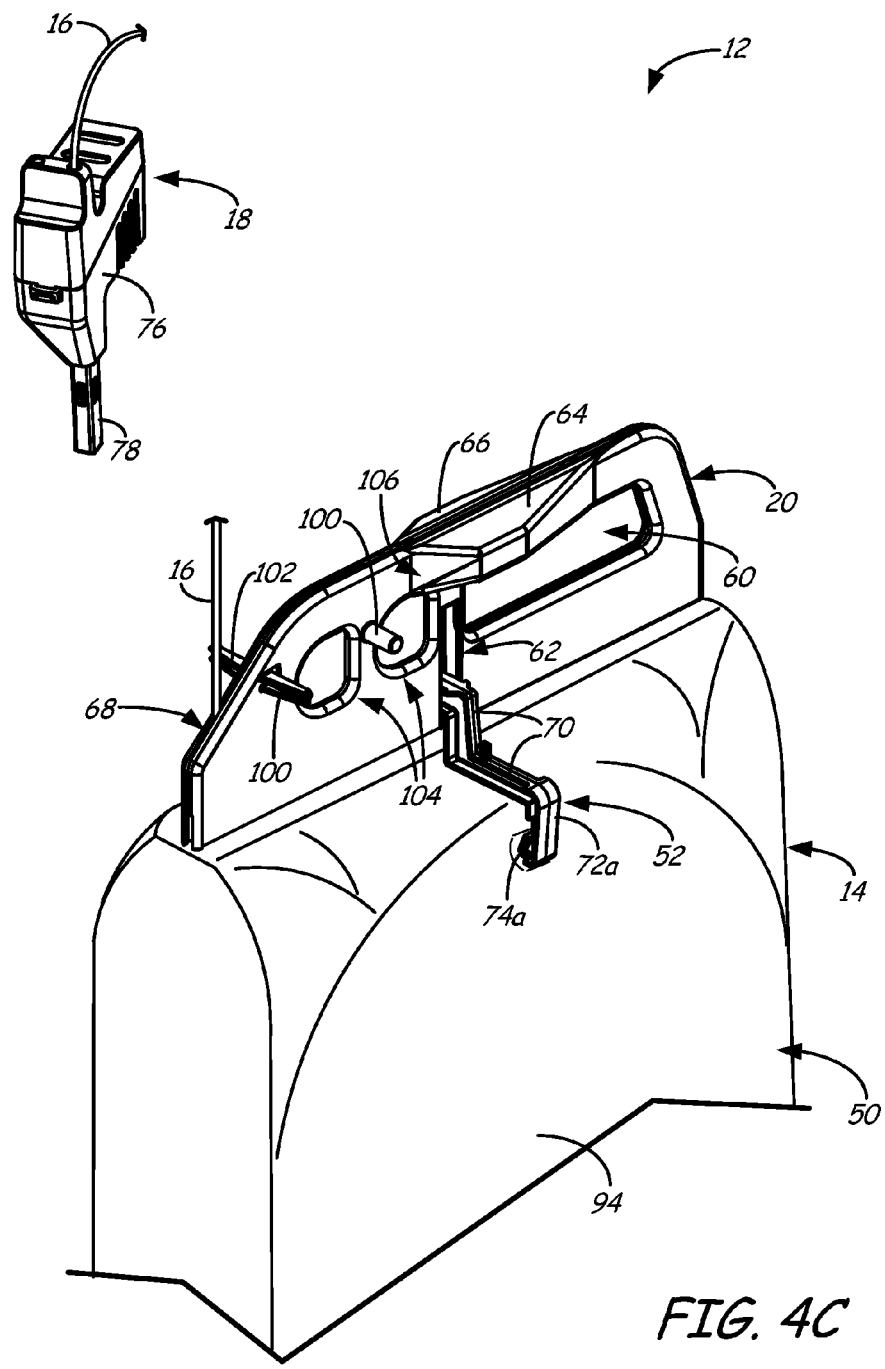

FIGS. 4A-4C illustrate a suitable process for manufacturing spool assembly 12. As shown in FIG. 4A, the process involves inserting module 80 into opening 82 of wrapper bag 50. Further discussion of module 80 and how it may be manufactured is provided below. Briefly, module 80 includes shell 84, spool 86, and eyelet seal 88, where spool 86 includes a supply of filament 90 (typically, a moisture-sensitive material), and, in the embodiment shown, is rotatably retained within shell 84. Eyelet seal 88 is a seal component that extends through shell 84 and provides a sealed pathway for guide tube 16 (and for filament 90 extending through guide tube 16).

As shown in FIG. 4B, after module 80 is inserted into wrapper bag 50, the walls of wrapper bag 50 at opening 82 may then be sealed together to form sealed tab 92. Sealed tab 92 extends from the body of wrapper bag 50 in which module 80 resides (referred to as body 94), such that sealed tab 92 may be punctured or otherwise penetrated without breaking the seal of wrapper bag 50 at body 94. As further shown, eyelet seal 88 extends through sealed tab 92 to maintain the seal around guide tube 16, and to operably couple a retaining portion of guide tube 16 to wrapper bag 50. In other embodiments, eyelet seal 88 may be omitted and the retaining portion of guide tube 16 may otherwise be operably coupled to wrapper bag 50, for example, by application of a hot melt adhesive.

In alternative embodiments, wrapper bag 50 may be formed around module 80 using a variety of different techniques. For example, wrapper bag 50 may be wrapped around module 80 and sealed (e.g., shrink wrapped). In these alternative embodiments, wrapper bag 50 desirably retains an upward-extending tab corresponding to sealed tab 92, which may be punctured or otherwise penetrated without breaking the seal of wrapper bag 50 at body 94.

Handle sections 56 and 58 include reciprocating fasteners 96 for securing handle sections 56 and 58 together. This may be accomplished by positioning handle sections 56 and 58 on opposing sides of sealed tab 92, as illustrated by arrows 98, and inserting collarbone member 70 of locking arm 52 into the slot halves of lock slot 62 of handle sections 56 and 58 (referred to as slot halves 62a and 62b). Handle sections 56 and 58 may then be secured together with reciprocating fasteners 96. When fastened together, reciprocating fasteners 96 puncture through sealed tab 92 to securely suspend container portion 14 from handle 20 by sealed tab 92.

In one embodiment, sealed tab 92 may be pre-punctured at the intended locations of reciprocating fasteners 96 to allow reciprocating fasteners 96 to be easily inserted through the pre-punctured openings. However, in either case, the seal of sealed tab 92 extends below any of the punctures of reciprocating fasteners 96, thereby maintaining the seal of wrapper bag 50 at body 94.

Handle sections 56 and 58 also respectively include mounting pegs 100 and 102. Mounting pegs 100 and 102 are lateral pegs or other suitable features that are positioned to mount print heads (e.g., print heads 18) on either side of handle 20.

As shown in FIG. 4C, when secured together to form handle 20, handle sections 56 and 58 are partially offset from each other to define tube channel 68. Handle 20 also includes a pair of adjacent apertures 104 and cooling port 106. Apertures 104 are openings through handle 20 for reducing the weight of handle 20, and may also assist in increasing cooling air flow around print head 18 when print head 18 is mounted to handle 20. Cooling port 106 is an additional opening for allowing cooling air to flow around liquefier pump assembly 78 when liquefier pump assembly 78 is inserted into holster 64. For example, cooling port 106 may align with cooling vents of liquefier pump assembly 78.

After handle sections 56 and 58 are secured together, locking arm 52 may be pressed downward to the bottom of lock slot 62 to engage with spool 86 of module 80 retained within wrapper bag 50 and shell 84. Guide tube 16 may also be wound through channel 68 and print head 18 may be inserted into holster 64 and mounted to mounting pegs 100, such as shown above in FIG. 3.

In the shown embodiment, cartridge assembly 76 of print head 18 has a non-symmetrical design that includes a generally flat side. Depending on the positioning of liquefier pump assembly 78 in print head 20, print head 20 may be either configured for insertion into holster 64 or holster 66. As discussed in Swanson et al., U.S. patent application Ser. No. 12/976,111, the mirror-image designs of print heads 18 may assist users in determining where to insert the respective print heads 18 into head carriage 36 (i.e., to prevent reverse order insertions).

FIGS. 5A, 5B, 6A, and 6B illustrate the operation of locking arm 52 to engage and disengage with spool 86 retained within wrapper bag 50 (spool 86 illustrated with hidden lines). As discussed further below, spool 86 includes multiple holes or indentations 108 and 110 (illustrated with hidden lines) extending radially around opposing flanges of spool 86.

Figure 5A:
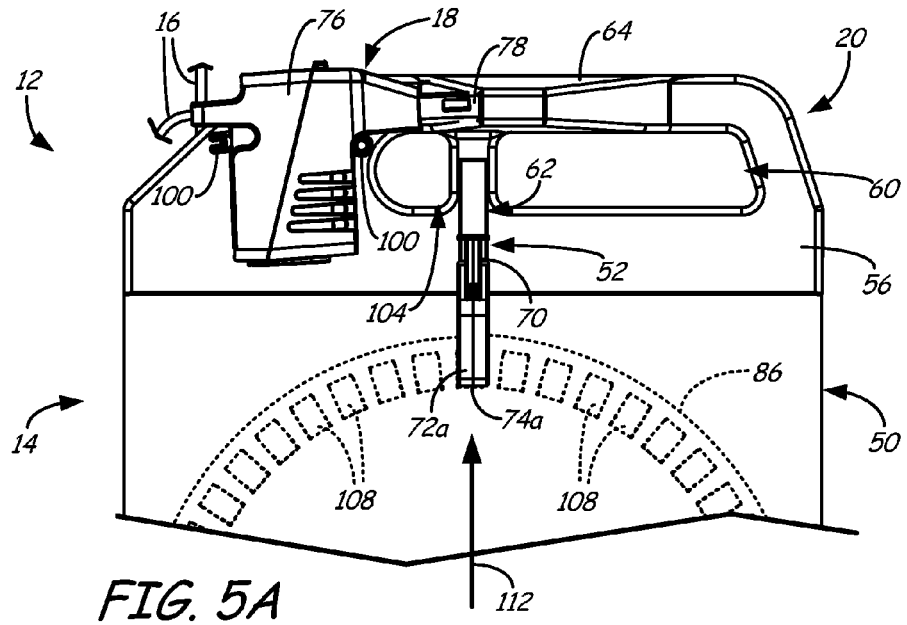
FIG. 5A is a right side expanded view of the top portion of the spool assembly, illustrating a locking arm engaged with a spool retained within a sheath.
Figure 5B:
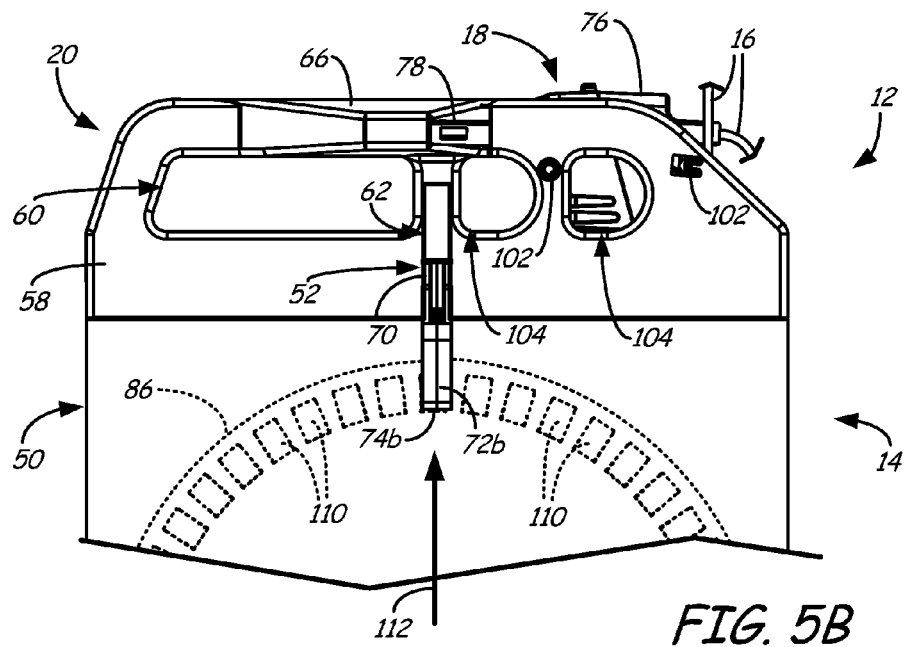
FIG. 5B is a left side expanded view of the top portion of the spool assembly, illustrating the locking arm engaged with the spool.

FIGS. 5A and 5B respectively show the opposing sides of handle 20 with locking arm 52 engaged with both sides of spool 86. In this locked state, collarbone member 70 of locking arm 52 is positioned at the bottom of lock slot 62, which engages contact tips 74a and 74b with indentations 108 and 110 of spool 86 (through wrapper bag 50 and shell 84), as discussed below. To unlock spool 86, collarbone member 70 is raised upward through lock slot 62 until contact tips 74a and 74b disengage from spool 86, as illustrated by arrows 112 in FIGS. 5A and 5B.

For example, as spool assembly 12 is lowered into bay 28 (shown in FIGS. 1 and 2) in its upright orientation, contact tips 74a and 74b of locking arm 52 engage ledges of the opposing bay slots 54 (shown in FIG. 2). Upon reaching the ledges of bay slots 54, the continued downward movement of spool assembly 12 into bay 28 pushes locking arm 52 upward in lock slot 62, as illustrated by arrows 112.

Figure 6A:
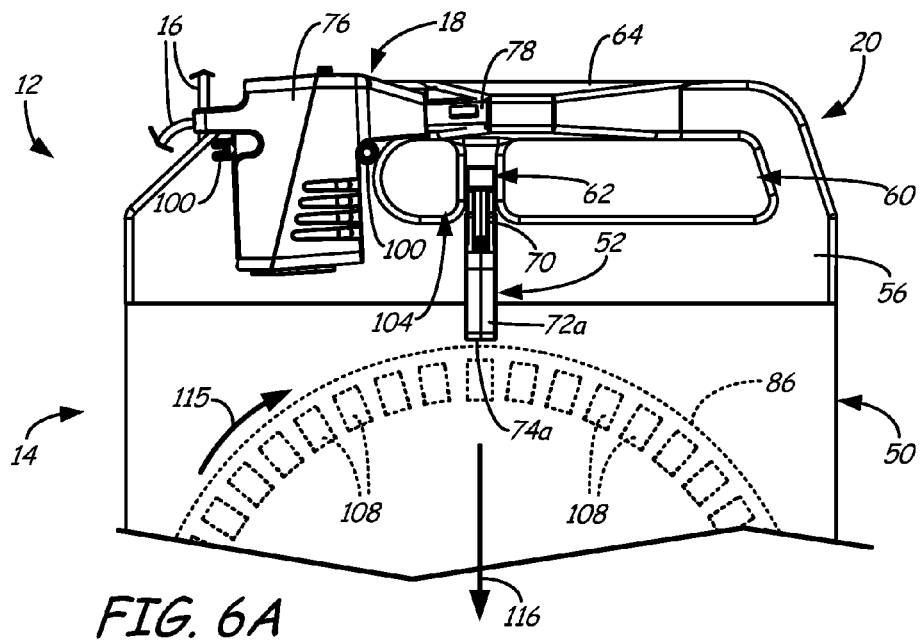
FIG. 6A is a right side expanded view of the top portion of the spool assembly, illustrating the locking arm disengaged from the spool.
Figure 6B:
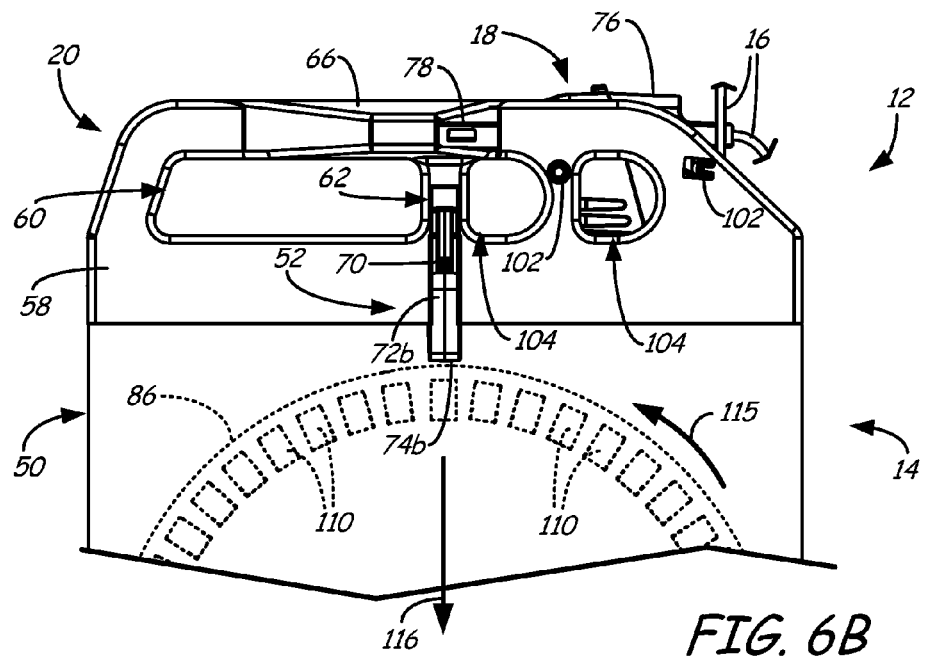
FIG. 6B is a left side expanded view of the top portion of the spool assembly, illustrating the locking arm disengaged from the spool.

As shown in FIGS. 6A and 6B, this positions collarbone member 70 at or adjacent to the top of lock slot 62, and allows spool 86 to rotate within shell 84, as illustrated by arrows 115. To re-engage locking arm 52 with spool 86, collarbone member 70 may be lowered through lock slot 62 until contact tips 74a and 74b re-engage with indentations 108 and 110 (through wrapper bag 50 and shell 84), as illustrated by arrows 116. Spool 86 may be rotated by a small amount to fully engage contact tips 74a and 74b with indentations 108 and 110. This locks spool 86 and prevents further rotation.

The engagements and disengagements of locking arm 52 with spool 86, as shown above in FIGS. 5A, 5B, 6A, and 6B occur through wrapper bag 50. The deformable nature of wrapper bag 50 allows wrapper bag 50 to conform to the locking engagement between contact tips 74a and 74b of locking arm 52 and indentations 108 and 110 of spool 86. Therefore, wrapper bag 50 may remain intact (i.e., not punctured or otherwise penetrated) during the engagements between locking arm 52 and spool 86, thereby preserving the barrier from ambient conditions.

Figure 7:
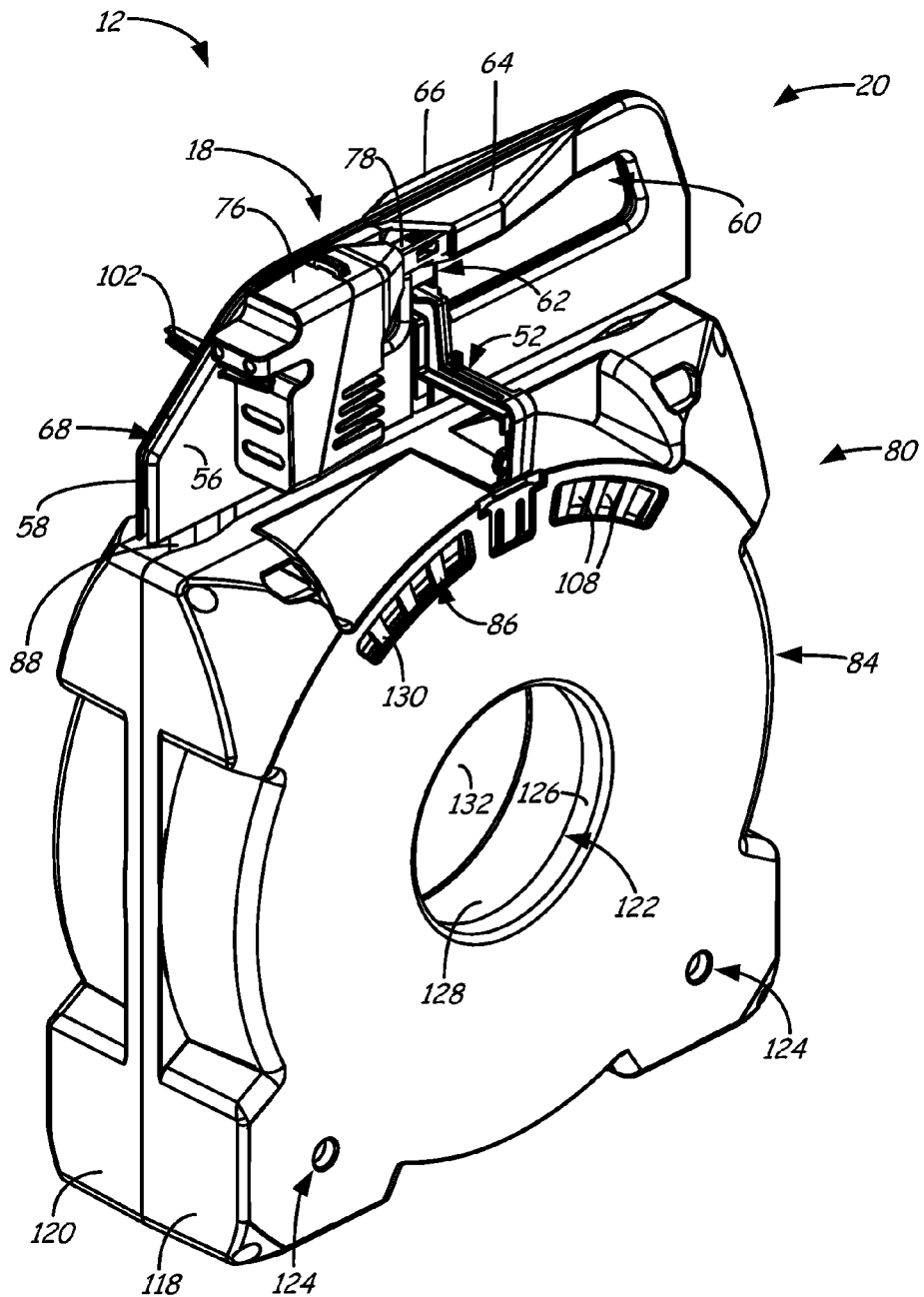
FIG. 7 is a top right-side perspective view of the spool assembly as shown in FIG. 3, with the sheath omitted, and with the locking arm disengaged from the spool.
Figure 8:
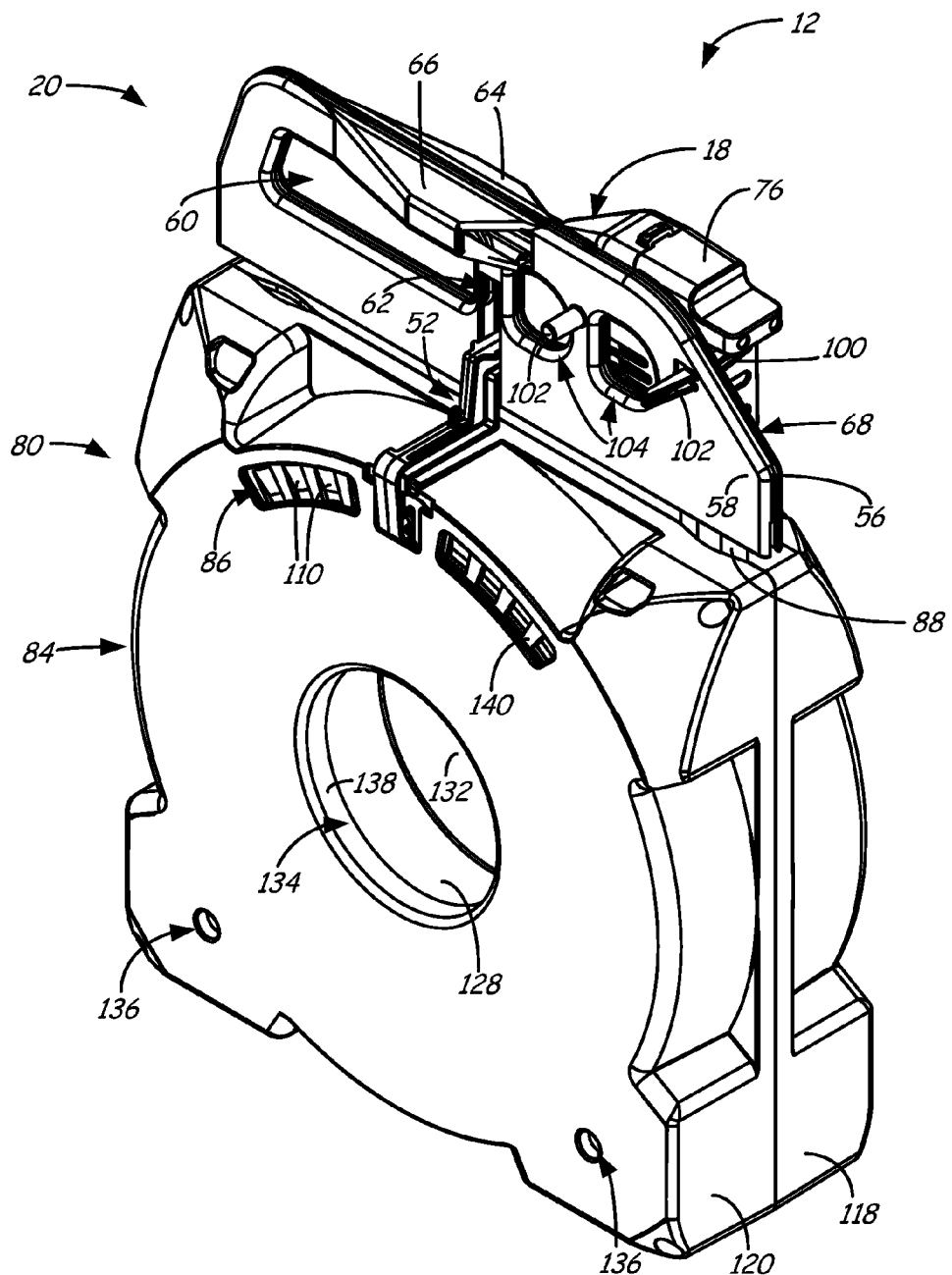
FIG. 8 is a top left-side perspective view of the spool assembly, with the sheath omitted, and with the locking arm engaged with the spool.

FIGS. 7 and 8 further illustrate spool assembly 12 with wrapper bag 50 omitted for ease of discussion. As shown in FIG. 7, shell 84 and spool 86 of module 80 are disposed below handle 20, and locking arm 52 is engagable with spool 86 through shell 84. In the shown embodiment, however, shell 84 is not directly connected to handle 20. Rather, as discussed above, handle 20 is secured to sealed tab 92 of wrapper bag 50 (shown in FIG. 4B), where wrapper bag 50 retains shell 84 and spool 86.

Shell 84 includes right shell section 118 and left shell section 120, which, in the shown embodiment, are identical rigid structures fabricated from one or more polymeric and/or metallic materials. Shell sections 118 and 120 are secured together to rotatably retain and protect spool 86 in a hub-less manner. Right shell section 118 includes central opening 122 and inwardly-extending posts 124 at its base end. Central opening 122 is an opening into shell 84 through which spool 86 may be viewed, and includes inwardly-extend rim 126.

Spool 86 is a hub-less spool that includes hollow shaft 128 and flange 130. Hollow shaft 128 is a filament-receiving shaft that is visible through central opening 122 of right shell section 118. Hollow shaft 128 has a hollow interior that is bisected by middle wall 132, where middle wall 132 provides structural support for spool 86. Flange 130 extends from a first end of hollow shaft 128 facing right shell section 118, and includes indentations 108 extending radially around its outer perimeter.

As shown in FIG. 8, left shell section 120 includes central opening 134 and inwardly-extending posts 136 at its base end, which are identical to central opening 122 and posts 124 of right shell section 118. Central opening 134 includes inwardly-extend rim 138, which is identical to inwardly-extend rim 126 of right shell section 118. Spool 86 also includes flange 140, which extends from a second end of hollow shaft 128 facing left shell section 120, and includes indentations 110 extending radially around its outer perimeter.

Rims 126 and 138 are suitable for aligning spool 86 with shell sections 118 and 120 when manufacturing module 80. However, as discussed below, in the shown embodiment, spool 86 desirably does not rest on rims 126 and 138 when spool assembly 12 is positioned upright. Rather, spool 86 rests on a pair of bearing rollers (shown below in FIG. 11) mounted on posts 124 and 136, which reduces the contact surface area between spool 86 and shell 84, and hence, reduces frictional resistance.

Reduced friction of rotating spool 86 is beneficial to reduce the pulling force required by print head 18 to draw the successive segments of filament 90, as well as reducing the variations in the required pulling force. Variations in the pulling force may affect the response times that print head 18 relies upon for accurately melting and extruding the consumable material from filament 90, which can affect the accuracy of the printing operation. In alternate embodiments, spool 86 may rest on and rotate around a hub within shell 84, and, in such embodiments, posts 124 and 136, along with the bearing rollers, may be omitted.

Figure 9:
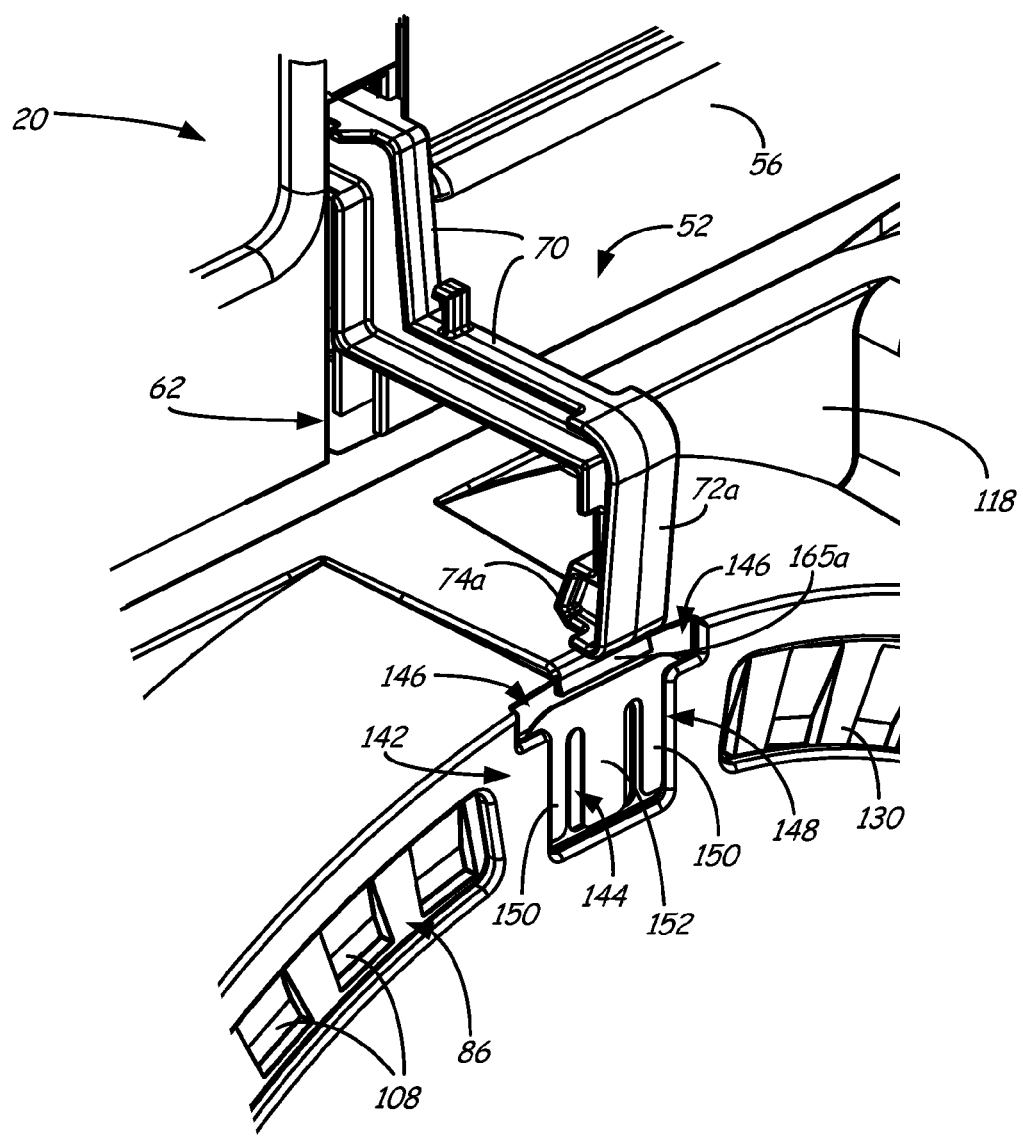
FIG. 9 is an expanded view of an engagement between the locking arm and the spool, as taken from the top right-side perspective view of FIG. 8, where the locking arm is shown disengaged from the spool.
Figure 10:
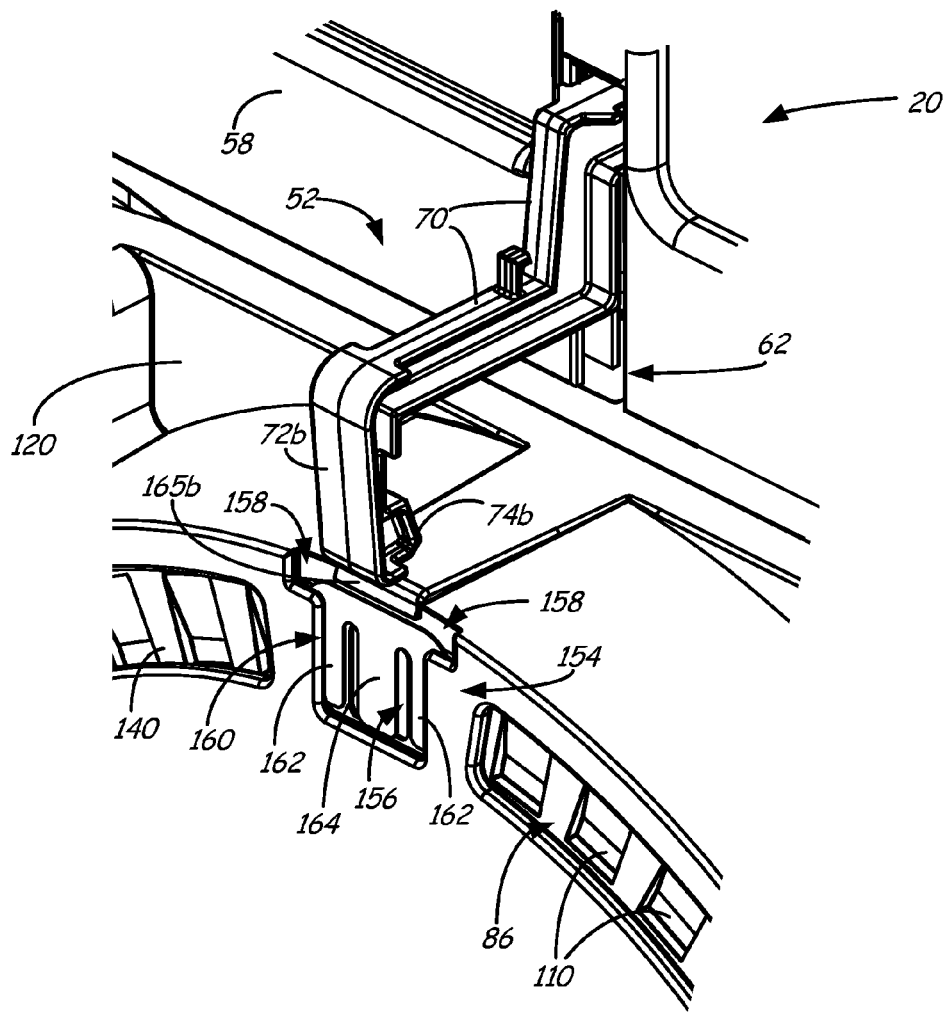
FIG. 10 is an expanded view of an engagement between the locking arm and the spool, as taken from the top left-side perspective view of FIG. 9, where the locking arm is shown disengaged from the spool.

FIGS. 9 and 10 are expanded views of the engagements between locking arm 52 and spool 86 through shell sections 118 and 120, respectively. As shown in FIG. 10, contact tip 74a of locking arm 52 may engage indentations 108 of flange 130 through the top end of right shell section 118. In particular, right shell section 118 includes recessed notch 142, which itself includes engagement opening 144 and side slots 146. Engagement opening 144 is an opening through right shell section 118 for access to indentations 108. Side slots 146 are located on opposing sides of engagement opening 144, and are configured to retain flexure tab 148.

In the shown example, flexure tab 148 is an M-shaped component derived from one or more polymeric and/or metallic materials. For example, as shown, flexure tab 148 includes three prongs, namely outer prongs 150 and central prong 152. Outer prongs 150 are configured to slide within side slots 146 for retaining flexure tab 148 in recessed notch 142 with a frictional fit and/or with an adhesive.

Central prong 152 extends across engagement opening 144 and may be flexed inward through engagement opening 144 by contact tip 74a. In the shown embodiment, contact tip 74a extends inwardly at an angle from appendage 72a, thereby being configured to press central prong 152 inward through engagement opening 144. When flexed inward through engagement opening 144, central prong 152 also extends into one of indentations 108 to prevent spool 86 from rotating.

As shown in FIG. 10, contact tip 74b of locking arm 52 may engage indentations 110 of flange 140 through the top end of left shell section 120. In particular, left shell section 120 includes recessed notch 154, which itself includes engagement opening 156 and side slots 158. Engagement opening 156 and side slots 158 may function in the same manner as engagement opening 144 and side slots 146 (shown in FIG. 9) for retaining flexure tab 160. In the shown embodiment, engagement opening 156 is aligned directly opposite of engagement opening 144, such that each are simultaneously engaged by contact tips 74a and 74b, providing redundancy in operation. In an embodiment, engagement openings 144 and 156 may be offset from one another such that only one is engaged at a given time. In a further alternate embodiment, spool 86 may have an indentations on only a single flange (e.g., either indentations 108 or 110).

Flexure tab 160 is a second M-shaped component that is identical to flexure tab 148, and includes outer prongs 162 and central prong 164. Outer prongs 162 are configured to slide within side slots 158 for retaining flexure tab 160 in recessed notch 154 with a frictional fit and/or with an adhesive. Central prong 164 functions in the same manner as central prong 152 of flexure tab 148, and may be flexed inward through engagement opening 156 by contact tip 74b. In the shown embodiment, contact tip 74b also extends inwardly at and angle from appendage 72b, thereby being configured to press central prong 164 inward through engagement opening 156. When flexed inward through engagement opening 156, central prong 164 extends into one of indentations 110 to prevent spool 86 from rotating.

Flexure tabs 148 and 160 increase the ease at which locking arm 52 disengages from spool 86 when spool assembly 12 is loaded into bay 28, while also preventing locking arm 52 from prematurely disengaging from spool 86, such as during transportation or storage. As shown in FIGS. 9 and 10, central prongs 152 and 164 provide smooth surfaces for contact tips 74a and 74b to travel along when locking arm 52 is pressed upward through lock slot 62 of handle 20. This reduces the force required to disengage contact tips 74a and 74b from indentations 108 and 110, and to move locking arm 52 upward through lock slot 62. Without flexure tabs 148 and 160, contact tips 74a and 74b may become mechanically stuck within engagements openings 144 and 156, which could prevent contact tips 74a and 74b from disengaging from spool 86 when spool assembly 12 is loaded into bay 28.

Flexure tabs 148 and 160 may be manufactured from one or more materials having shape memory and/or may be inherently biased outward and away from engagements openings 144 and 156. This allows central prongs 152 and 164 to bend back by sufficient amounts to fully exit indentations 108 and 110 when contact tips 74a and 74b disengage. Otherwise, central prongs 152 and 164 may undesirably remain engaged with indentations 108 and 110, preventing spool 86 from rotating even when locking arm 52 is disengaged. This inherent biasing also prevents locking arm 52 from sliding down under gravity by requiring a minimal amount of pressure to overcome the bias (greater than attainable by gravity itself). This prevents locking arm 52 from unintentionally locking spool 86, such as during a printing operation with system 10.

As further shown in FIGS. 9 and 10, right shell section 118 includes overhang lip 165a (shown in FIG. 9) and left shell section 120 includes overhang lip 165b (shown in FIG. 10). Overhang lip 165a is disposed over recessed notch 142, and in particular, over flexure tab 148. Similarly, overhang lip 165b is disposed over recessed notch 154 and flexure tab 160. Overhang lips 165a and 165b prevent flexure tabs 148 and 160 from dislodging from recessed notches 142 and 154 when locking arm 52 is disengaged. Otherwise, without overhang lips 165a and 165b, flexure tabs 148 and 160 may be pulled out of recessed notches 142 and 154, and fall down into wrapper bag 50.

In an alternative embodiment, locking arm 52 may directly engage with indentations 108 and 110 without the use of flexure tabs 148 and 160. In this embodiment, locking arm 52 is desirably configured to release from indentations 108 and 110 and engagements openings 144 and 156 without requiring undue force. For example, contact tips 74a and 74b may include sloped surfaces that extend through engagements openings 144 and 156 and into indentations 108 and 110 when engaged. Accordingly, the terms "operably engage", "operable engagement", and the like, with reference to locking arm 52 and spool 86, refer to indirect engagements (e.g., with flexure tabs 148 and 160) and to direct engagements.

Figure 11:
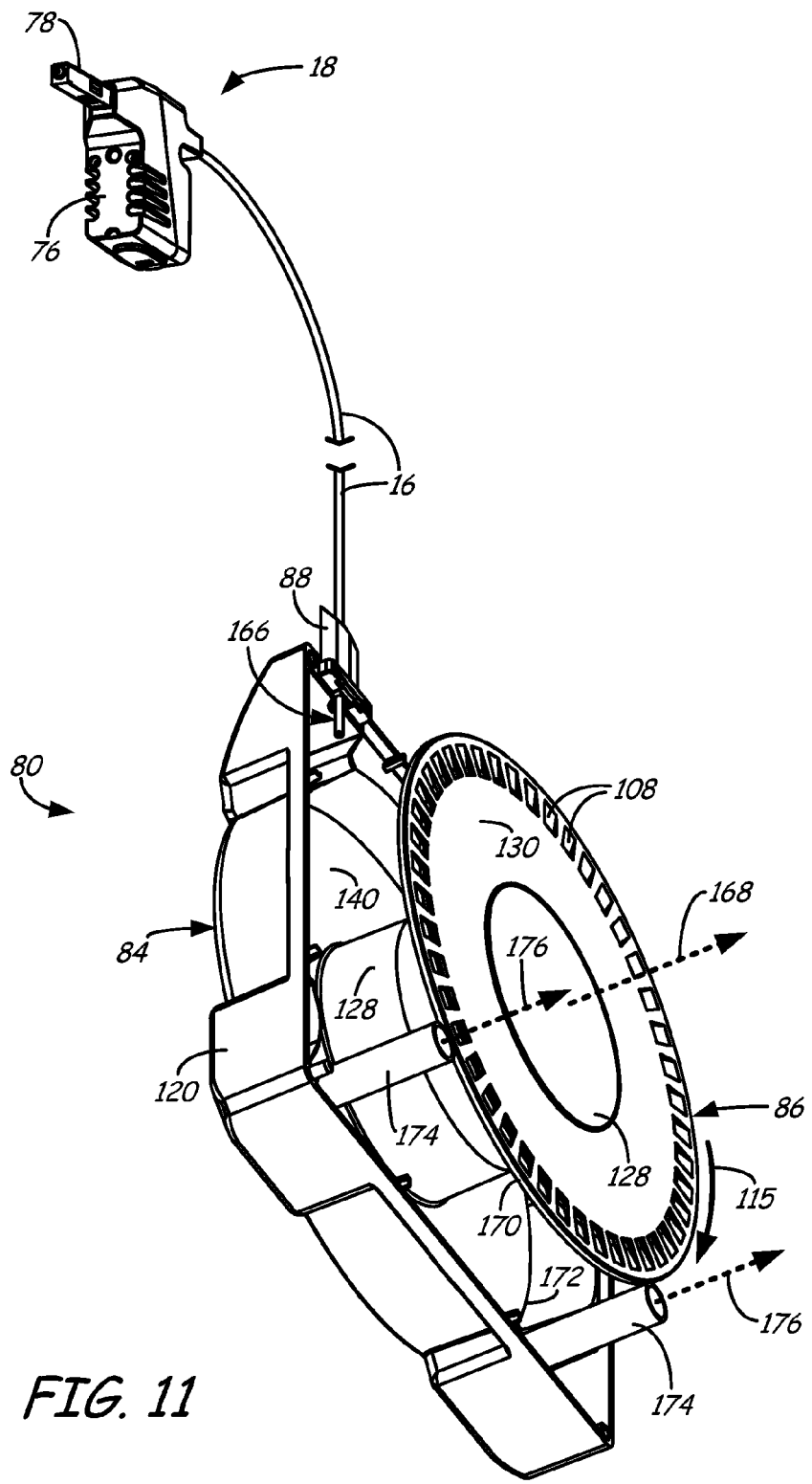
FIG. 11 is a bottom right-side perspective view of the spool assembly with sheath and a portion of a housing structure omitted.

FIG. 11 further illustrates spool assembly 12 with handle 20, wrapper bag 50, locking arm 52, filament 90, and right shell section 118 omitted for ease of discussion. As shown, guide tube 16 has a first end 166 that extends within shell 84, and a second end (not shown) disposed within cartridge assembly 76 of print head 18. First end 166 of guide tube 16 remains secured within shell 84 with eyelet seal 88.

Spool 86 rotates in the direction of arrow 115 around axis 168, where, when spool assembly 12 is upright, axis 168 is substantially aligned in a horizontal plane. Flanges 130 and 140 of spool 86 also respectively include perimeter edges 170 and 172, which are the outer annular edges of flanges 130 and 140.

Module 80 also includes bearing rollers 174, which are located at the base of shell 84 on posts 124 and 136 (shown in FIGS. 7 and 8) for supporting perimeter edges 170 and 172 of spool 86, and may rotate around axes 176. Axes 176 are substantially parallel to each other and to axis 168, but are not co-linear with each other or with axis 168. Bearing rollers 174 may be fabricated from one or more polymeric and/or plastic materials, and allow spool 86 to rotate around axis 168 with only two contact points on each of perimeter edges 170 and 172. In alternative embodiments, bearing rollers 174 may be replaced with a variety of different bearing supports, such as a pair of non-rotatable bearing shafts that extend along axes 176 between shell sections 118 and 120.

Figure 12:
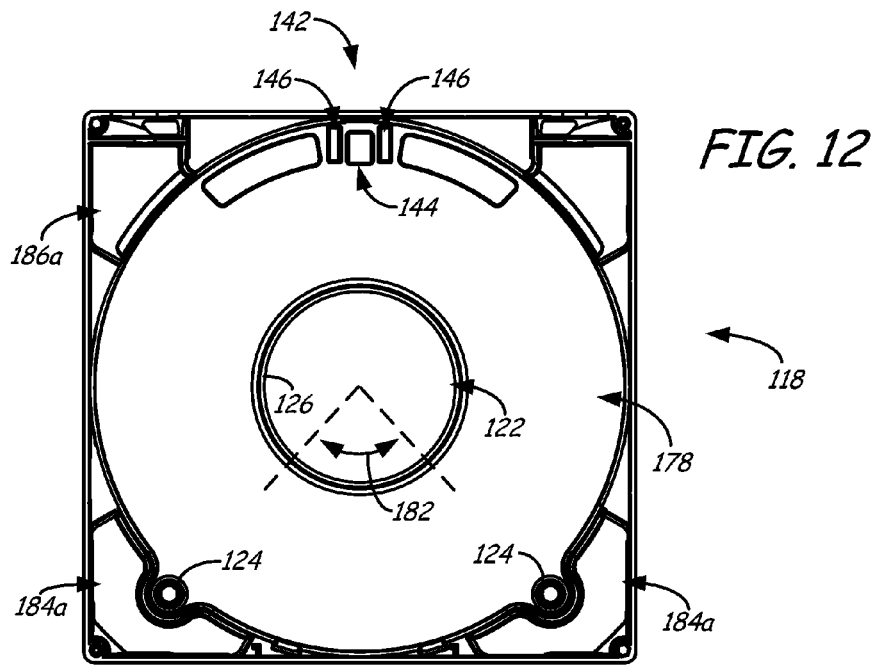
FIG. 12 is a left side view of a first shell section of the housing structure, showing an interior side of the first shell section.
Figure 13:
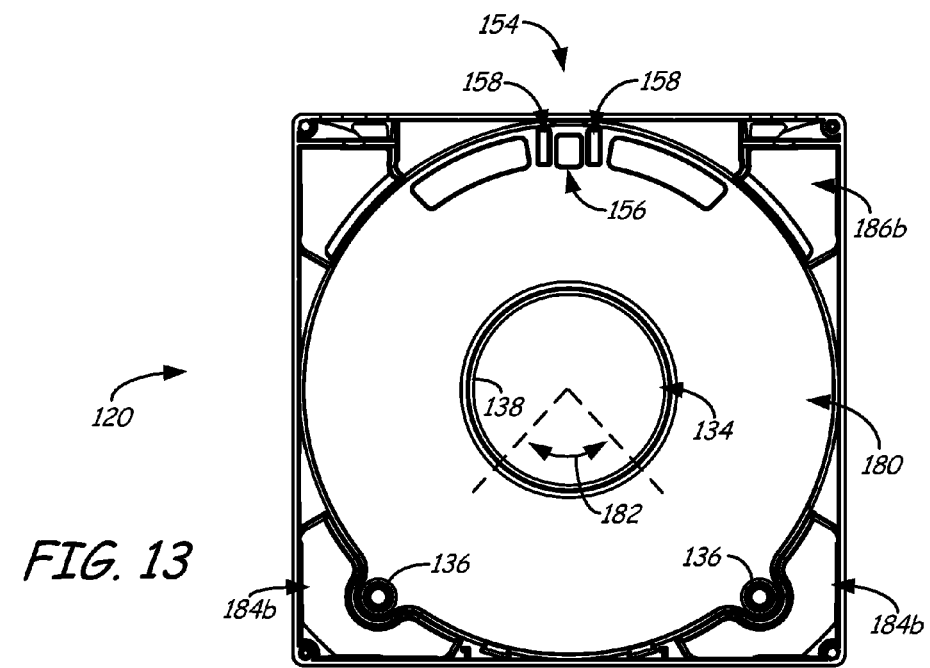
FIG. 13 is a right side view of a second shell section of the housing structure, showing an interior side of the second shell section.

FIGS. 12 and 13 are respective interior views of right shell section 118 and left shell section 120, where spool 86 and bearing rollers 174 are omitted for ease of discussion. A comparison of FIGS. 12 and 13 show that right shell section 118 and left shell section 120 are identical structures. As shown in FIG. 12, right shell section 118 includes interior region 178. Similarly, as shown in FIG. 13, left shell section 120 includes interior region 180. When right shell section 118 and left shell section 120 are secured together to form shell 84, interior regions 178 and 180 define a combined volume of shell 84 to retain spool 86 and bearing rollers 174.

Spool 86, retained within the combined volume defined by interior regions 178 and 180, is supported by bearing rollers 174 in a hub-less manner. As shown, posts 124 and 136 (which retain bearing rollers 174) are radially offset from each other by about angle 182, based on an axis of rotation of spool 86 (i.e., axis 168, shown in FIG. 11). Examples of suitable angles for angle 182 range from about 75 degrees to about 105 degrees, with particularly suitable angles ranging from about 85 degrees to about 95 degrees (e.g., about 90 degrees, as shown in FIGS. 12 and 13). These suitable angles provide sufficient bearing support for rotating spool 86 with reduced contact surface area when spool assembly 12 is upright (e.g., as shown in FIGS. 1-3).

Two bearing rollers or supports provide a particularly suitable support arrangement for spool 86. However, in alternative embodiments, spool assembly 12 may include additional numbers of bearing rollers or supports. In further alternate embodiments, bearing rollers 174 may be replaced with non-rotatable bearing supports that each provide a friction-reduced surface on which perimeter edges 170 and 172 of flanges 130 and 140 may rotate.

Additionally, when secured together, the bottom corners of right shell section 118 and left shell section 120 (respectively referred to as corner regions 184a and 184b in FIGS. 12 and 13) are walled off from the interior volume of shell 84 and bearing rollers 174 to define a pair of corner compartments. These corner compartments within shell 84 are convenient locations for storing items, such as desiccant packages for maintaining a low-moisture environment within container portion 14, identification chips (e.g., RFID chips), and the like.

Figure 14:
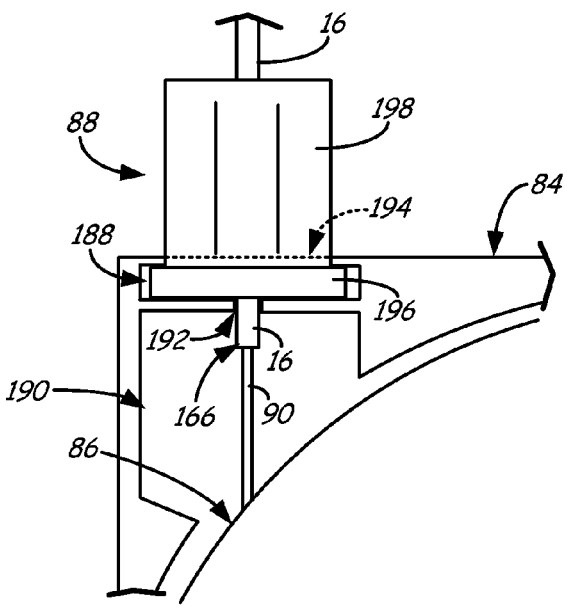
FIG. 14 is schematic illustration of a top corner of the housing structure engaged with an eyelet seal of the spool assembly.

Also when secured together, the top corners of right shell section 118 and left shell section 120 (respectively referred to as corner regions 186a and 186b in FIGS. 12 and 13) define a slot and an offset region for eyelet seal 88. As shown in FIG. 14, corner regions 186a and 186b define slot 188 and offset region 190, where slot 188 is accessible to offset region 190 through opening 192, and is accessible to the exterior of shell 84 through opening 194.

As further shown, eyelet seal 88 is secured to shell 84 at slot 188, where eyelet seal 88 includes base portion 196 and extension portion 198. Base portion 196 and extension portion 198 are each rigid components fabricated from one or more polymeric and/or metallic materials. Base portion 196 is the component of eyelet seal 88 secured in slot 188, and extension portion 198 extends out of shell 84 through opening 194.

Guide tube 16 correspondingly extends through extension portion 198, base portion 196, and opening 192, such that inlet end 166 of guide tube 16 is located within offset region 190. Offset region 190 allows inlet end 166 of guide tube 16 to be positioned at a suitable offset location relative to spool 86 to receive the successive segments of filament 90 from spool 86 as spool 86 rotates.

Figure 15:
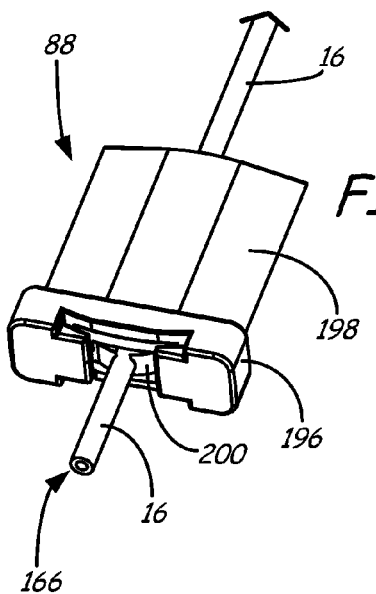
FIG. 15 is a perspective view of the eyelet seal in use with a guide tube.
Figure 16:
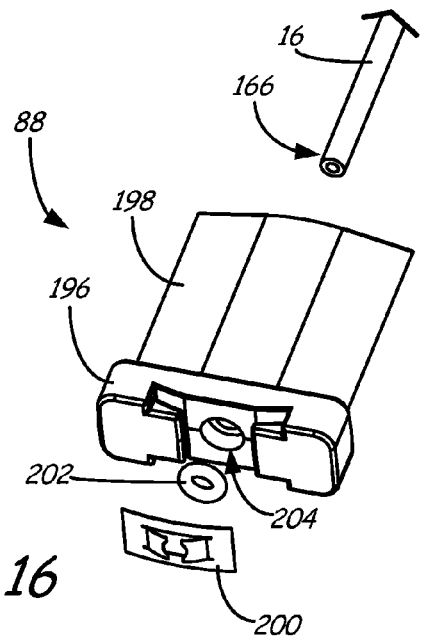
FIG. 16 is an exploded perspective view of the eyelet seal and the guide tube.

FIGS. 15 and 16 further illustrate eyelet seal 88 and its engagement with guide tube 16. As shown in FIG. 15, eyelet seal 88 also includes retention clip 200 mounted to base portion 196, where guide tube 16 extends through extension portion 198 and base portion 196, and further through retention clip 200. Retention clip 200 is configured to allow guide tube 16 to be readily inserted into container portion 14, but reduces the ability pull guide tube 16 back out of container portion 14. This reduces the risk of guide tube 16 becoming detached from container portion 14, which can potentially break the seal of container portion 14.

As shown in FIG. 16, eyelet seal 88 may also include gasket seal 202, which is disposed between base portion 196 and retention clip 200. Guide tube 16 exits the inner conduit or channel of extension portion 198 and base portion 194 (referred to as inner conduit 204), and is also inserted through gasket seal 202. Gasket seal 202 accordingly assists in maintaining the barrier from ambient conditions within container portion 14 during transportation, storage, and use of spool assembly 12.

Extension portion 198 of eyelet seal 88 has a generally flat, tapered geometry compared to the cylindrical geometry of guide tube 16. This allows wrapper bag 50 to be collapsed around extension portion 198 to form seal tab 92 (shown in FIG. 4B) in a manner that provides a good seal around extension portion 198. Inner conduit 204 accordingly has a first opening within shell 84 (i.e., at gasket seal 202) and a second opening located outside of wrapper bag 50. While guide tube 16 and inner conduit 204 are illustrated with cylindrical inner diameters, in alternative embodiments, guide tube 16 and inner conduit 204 may exhibit non-cylindrical inner cross-sections (e.g., rectangular cross-sections for use with ribbon filaments).

Additionally, the rigid nature of extension portion 198 prevents guide tube 16, which is relatively flexible, from collapsing under the seal at seal tab 92. Thus, spool assembly 12 provides a convenient and effective mechanism for delivering consumable filaments, while also maintaining a barrier from ambient conditions during transportation, storage, and use in system 10.

Figure 17:
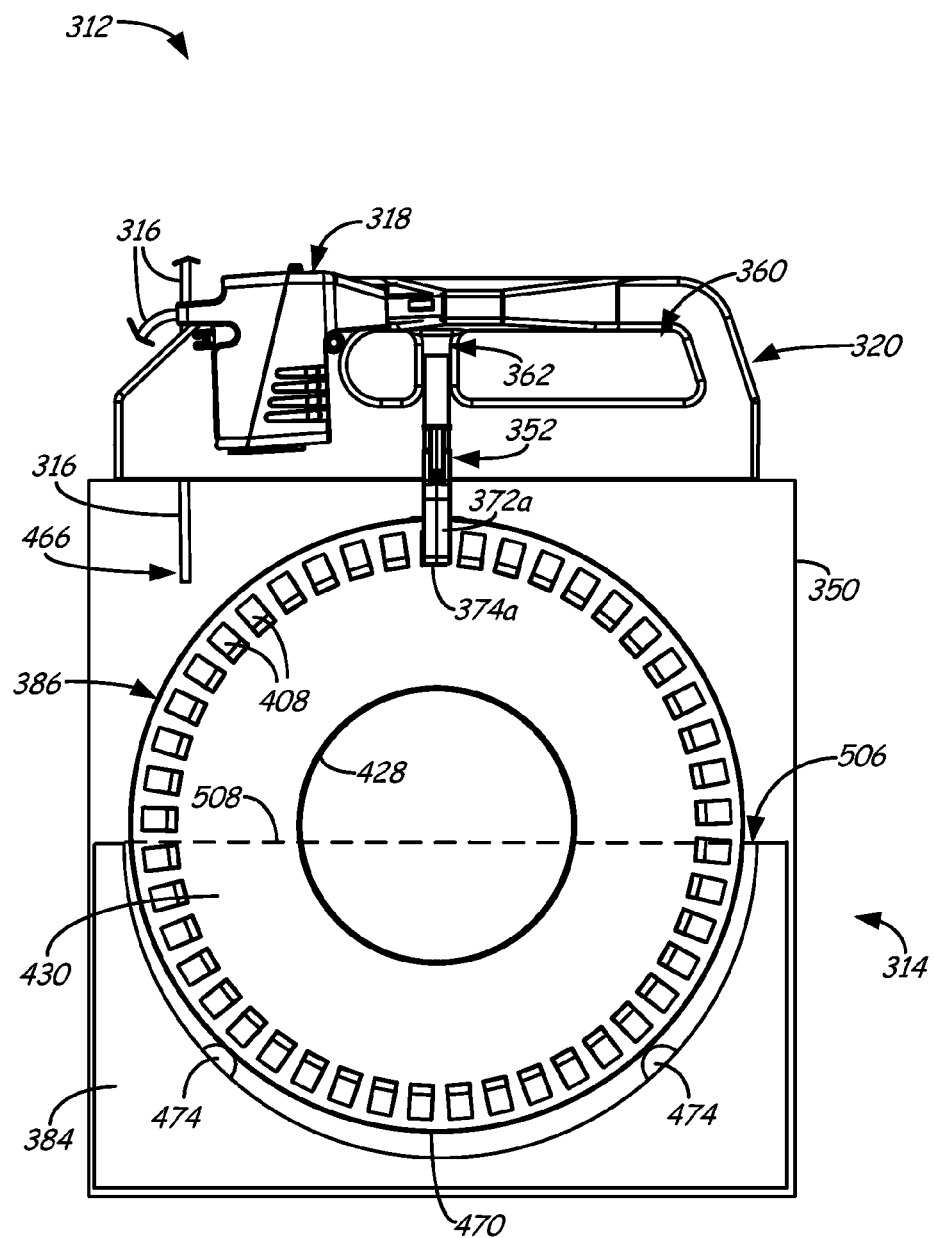
FIG. 17 is a side view of an alternative spool assembly of the present disclosure, which incorporates an alternative housing structure having a half-moon structure.

In alternative embodiments, spool assemblies 12 may incorporate housing structures (e.g., shell 84) having a variety of different designs, while also allowing the spools to rotate in hub-less manners. For example, FIG. 17 illustrates spool assembly 312, which corresponds to spool assembly 12, and where corresponding reference numbers are increased by "300" from those of spool assembly 12.

In this embodiment, spool assembly 312 includes half-moon housing structure 384 in lieu of shell 84. Housing structure 384 includes a U-shaped cavity 506 between a pair of side walls (only a single side wall is shown in FIG. 17, as illustrated by broken line 508). The base of cavity 506 includes bearing supports 424, which are non-rotatable bearing supports corresponding to bearing rollers 174 of spool assembly 12. In alternative embodiments, bearing supports 504 may be rotatable in the same manner as bearing rollers 174.

During assembly, spool 386 may be inserted into cavity 506 until the flange perimeter edges (e.g., perimeter edge 470) rests on bearing supports 474. In this case, the top half of spool 386 extends above housing structure 384, such that housing structure 384 encases only a portion of spool 386. The combined housing structure 384/spool 386 may then be inserted into wrapper bag 350 and sealed to form a sealed tab (not shown) corresponding to sealed tab 92. Additionally, an eyelet seal (not shown) retaining guide tube 316 may be secured with the sealed tab. However, in this embodiment, the eyelet seal is not retained by housing structure 384. In an alternative embodiment, the eyelet seal may be omitted.

Handle 320 may then be secured to the sealed tab, and guide tube 316 and print head 318 may be mounted to handle 320 in the same manner as discussed above for spool assembly 12. Additionally, locking arm 352 may engage indentations 408 and 410 of spool 386 to prevent spool 386 from rotating relative to frame structure 384. In this case, since frame structure 384 does not encase spool 386 at the engagement locations with locking arm 352, contact tips 374a and 374b of locking arm 352 directly engage indentations 408 and 410 without the use of flexure tabs. Locking arm 352 also desirably does not puncture or otherwise penetrate wrapper bag 350 during use to maintain the barrier from ambient conditions.

Spool assembly 312 may be used in system 10 in the same manner as spool assembly 12. The rotation of spool 386 with the use of bearing supports 474 also reduces the contact surface area between spool 386 and frame structure 384, thereby reducing frictional resistance. Accordingly, the spool assemblies of the present disclosure may include container portions having a variety of different components that allow filament-containing spools to rotate with reduced frictional resistance, and to engage with locking mechanisms through sheaths (e.g., wrapper bags) without puncturing or otherwise penetrating the sheaths.

The spool assemblies of the present disclosure (e.g., spool assemblies 12 and 312) may be used to deliver a variety of different part and support material filaments. Examples of suitable filaments for use in the spool assemblies of the present disclosure include those disclosed and listed in Crump et al., U.S. Pat. No. 5,503,785; Lombardi et al., U.S. Pat. Nos. 6,070,107 and 6,228,923; Priedeman et al., U.S. Pat. No. 6,790,403; Comb et al., U.S. Pat. No. 7,122,246; Batchelder, U.S. Patent Application Publication No. 2009/0263582; Hopkins et al., U.S. Patent Application Publication No. 2010/0096072; Batchelder et al., U.S. Patent Application Publication No. 2011/0076496; and Batchelder et al., U.S. Patent Application Publication No. 2011/0076495. Furthermore, the filaments may each include encoded markings, as disclosed in Batchelder et al., U.S. Patent Application Publication Nos. 2011/0117268, 2011/0121476, and 2011/0233804, which may be used with sensor assemblies 44 of system 10.

Although the present disclosure has been described with reference to preferred embodiments, workers skilled in the art will recognize that changes may be made in form and detail without departing from the spirit and scope of the disclosure.

The invention claimed is:

1. A spool assembly comprising:
a housing structure having an interior region;
a spool having a first axis of rotation, and being configured to reside in the interior region of the housing structure in a manner that is free or substantially free of any hub engagement, wherein the spool comprises:
 a filament-receiving shaft having a first end and a second end offset along the first axis of rotation;
 a first flange extending from the first end of the filament-receiving shaft, wherein the first flange comprises a first perimeter edge; and
 a second flange extending from the second end of the filament-receiving shaft, wherein the second flange comprises a second perimeter edge;
a first bearing support mounted to the housing structure within the interior region;
a second bearing support mounted to the housing structure within the interior region at an offset location from the first bearing support, wherein the first bearing support and the second bearing support are configured to support the first perimeter edge of the first flange and the second perimeter edge of the second flange while the spool is rotated around the first axis of rotation; and a locking mechanism configured to operably engage with the spool to prevent the spool from rotating relative to the housing structure, and to disengage from the spool to allow the spool to rotate relative to the housing structure, wherein the locking mechanism comprises an arm configured to engage with the spool to prevent the spool from rotating relative to the housing structure and wherein the arm does not penetrate a sealed sheath disposed around the housing structure retaining the spool when the arm engages with the spool.

2. The spool assembly of claim 1, wherein the first bearing support comprises first bearing roller rotatably mounted to the housing structure and having a second axis of rotation that is substantially parallel to the first axis of rotation of the spool.

3. The spool assembly of claim 2, wherein the second bearing support comprises second bearing roller rotatably mounted to the housing structure and having a third axis of rotation that is substantially parallel to the first axis of rotation of the spool.

4. The spool assembly of claim 1, and further comprising a consumable filament wound on the shaft.

5. The spool assembly of claim 1, and further comprising:
   a sealed sheath disposed around the housing structure retaining the spool; and
   a flexible guide tube comprising:
      a retaining portion operably coupled to the sealed sheath;
      a first end disposed within the sealed sheath that is configured to receive a consumable filament fed from the filament-receiving shaft; and
      a second end outside of the sealed sheath.

6. The spool assembly of claim 5, and further comprising a consumable filament wound on the shaft and fed to the flexible guide tube.

7. The spool assembly of claim 6, and further comprising an eyelet seal component retained by the housing structure and extending through the sealed sheath, wherein the eyelet seal component comprises:
   a first opening accessible to the interior region of the housing structure;
   a second opening located outside of the sealed sheath; and
   a channel connecting the first opening and the second opening, wherein the retaining portion of the flexible guide tube is positioned in the channel.

8. The spool assembly of claim 5, wherein the sealed sheath comprises a body that defines a barrier for the encased housing structure, and a tab outside of the barrier of the body, and wherein the spool assembly further comprises a handle secured to the tab in a manner that does not penetrate the barrier of the body.

9. The spool assembly of claim 5, and further comprising a print head, wherein the print head comprises:
   a cartridge assembly retaining the second end of the flexible guide tube; and
   a liquefier pump assembly coupled to the cartridge assembly.

10. The spool assembly of claim 9, and further comprising a handle operably supporting the housing structure, wherein the handle comprises a receptacle configured to receive the liquefier pump assembly of the print head.

* * * * *